United States Patent [19]
Suzuki et al.

[11] Patent Number: 5,577,816
[45] Date of Patent: Nov. 26, 1996

[54] METHOD OF AND SYSTEM FOR CONTROLLING BRAKES

[75] Inventors: Osamu Suzuki; Keishin Tanaka; Tatsuo Hayashi; Takushi Matsuto; Chiaki Kumagai; Takeshi Sakurai; Atsuo Ota, all of Wako, Japan

[73] Assignee: Honda Giken Kogyo Kabushiki Kaisha, Tokyo, Japan

[21] Appl. No.: 281,559

[22] Filed: Jul. 28, 1994

Related U.S. Application Data

[62] Division of Ser. No. 958,166, Oct. 8, 1992, Pat. No. 5,365,444.

[30] Foreign Application Priority Data

| Oct. 8, 1991 | [JP] | Japan | 3-260853 |
| Oct. 16, 1991 | [JP] | Japan | 3-267939 |
| Oct. 24, 1991 | [JP] | Japan | 3-278062 |

[51] Int. Cl.$^6$ ............................................. G06G 7/00
[52] U.S. Cl. ............................................. 303/174; 303/163
[58] Field of Search ...................... 303/93, 94, 95, 303/97, 99, 100, 102, 103, 104, 105, 108, 109, 163, 186, 165, 166, 167, 156, 176, 174; 364/426.02, 426.01, 426.04; 180/197

[56] References Cited

U.S. PATENT DOCUMENTS

| 3,836,207 | 9/1974 | Belart . | |
| 4,762,375 | 8/1988 | Maki et al. | 303/109 X |
| 4,787,682 | 11/1988 | Muto | 303/109 |
| 4,877,295 | 10/1989 | Yoshino | 303/109 |
| 5,005,916 | 4/1991 | Fujioka et al. | 303/103 |
| 5,015,042 | 5/1991 | Yoshino | 303/96 |
| 5,080,448 | 1/1992 | Mori et al. | 303/108 X |
| 5,109,694 | 5/1992 | Yahagi et al. | 364/426.02 |
| 5,157,612 | 10/1992 | Satomi | 364/426.02 |
| 5,185,702 | 2/1993 | Okubo | 180/197 |
| 5,185,703 | 2/1993 | Okubo | 364/426.02 |

(List continued on next page.)

FOREIGN PATENT DOCUMENTS 0219238  4/1987  European Pat. Off. .

(List continued on next page.)

*Primary Examiner*—Robert J. Oberleitner
*Assistant Examiner*—Peter M. Poon

[57] ABSTRACT

The ABS is provided with a modulator, and when the ABS is activated, control of the caliper pressure by the driver, is modified by the operation of the modulator having the aforementioned inlet valve (normally closed to a pressurized fluid source) and aforementioned outlet valve (normally open to a fluid exit), both controlled by the above-described control logic circuit. The modulator increases or decreases the caliper pressure, in response to changes in the pressurized fluid, regulated by such valves. Depending on the operation of the control logic circuit described above, three events may occur. When the inlet and outlet valves are not operated (i.e. their normal state), the modulator releases pressurized fluid through the output valve, and increases caliper pressure, to increase braking up to a predetermined maximum. If only the outlet valve is operated (i.e. both the inlet and outlet valves are closed), the modulator remains in a constant state and likewise, the caliper pressure is kept constant. If both the inlet and outlet valves are operated (i.e. opened and closed respectively), then in response to the increased pressurized fluid, the modulator effects a decrease in caliper pressure to reduce braking. The above is summarized in FIG. 2.

Thus it is seen that the brake control is effected by setting a threshold value for each of the slip ratio $\lambda$ and the acceleration/deceleration $\alpha$, and determining whether the actual state of each wheel (i.e. $\lambda$ and $\alpha$), is at their respective threshold value or above (less). It is thus necessary to set processing times as short as possible to improve the operating speed of an actuator which executes the process referred to above. However, there are limitations on the operating speed of the actuator, and an improvement is actually difficult to achieve.

In another prior art system, the modulator comprises an input hydraulic chamber which communicates with a master cylinder, for

34 Claims, 31 Drawing Sheets

U.S. PATENT DOCUMENTS

| | | | |
|---|---|---|---|
| 5,185,704 | 2/1993 | Okubo | 364/426.02 |
| 5,210,690 | 5/1993 | Kageyama et al. | 364/426.02 |
| 5,240,313 | 8/1993 | Yoshino et al. | |

FOREIGN PATENT DOCUMENTS

| | | | |
|---|---|---|---|
| 0322911 | 7/1989 | European Pat. Off. . | |
| 0341866 | 11/1989 | European Pat. Off. . | |
| 0371932 | 6/1990 | European Pat. Off. . | |
| 0374924 | 6/1990 | European Pat. Off. . | |
| 0388035 | 9/1990 | European Pat. Off. . | |
| 0435227 | 7/1991 | European Pat. Off. . | |
| 0470657 | 2/1992 | European Pat. Off. . | |
| 0489451 | 6/1992 | European Pat. Off. . | |
| 0537995 | 4/1993 | European Pat. Off. . | |
| 0539060 | 4/1993 | European Pat. Off. . | |
| 3924448 | 5/1989 | Germany . | |
| 0231860 | 10/1987 | Japan | 303/109 |

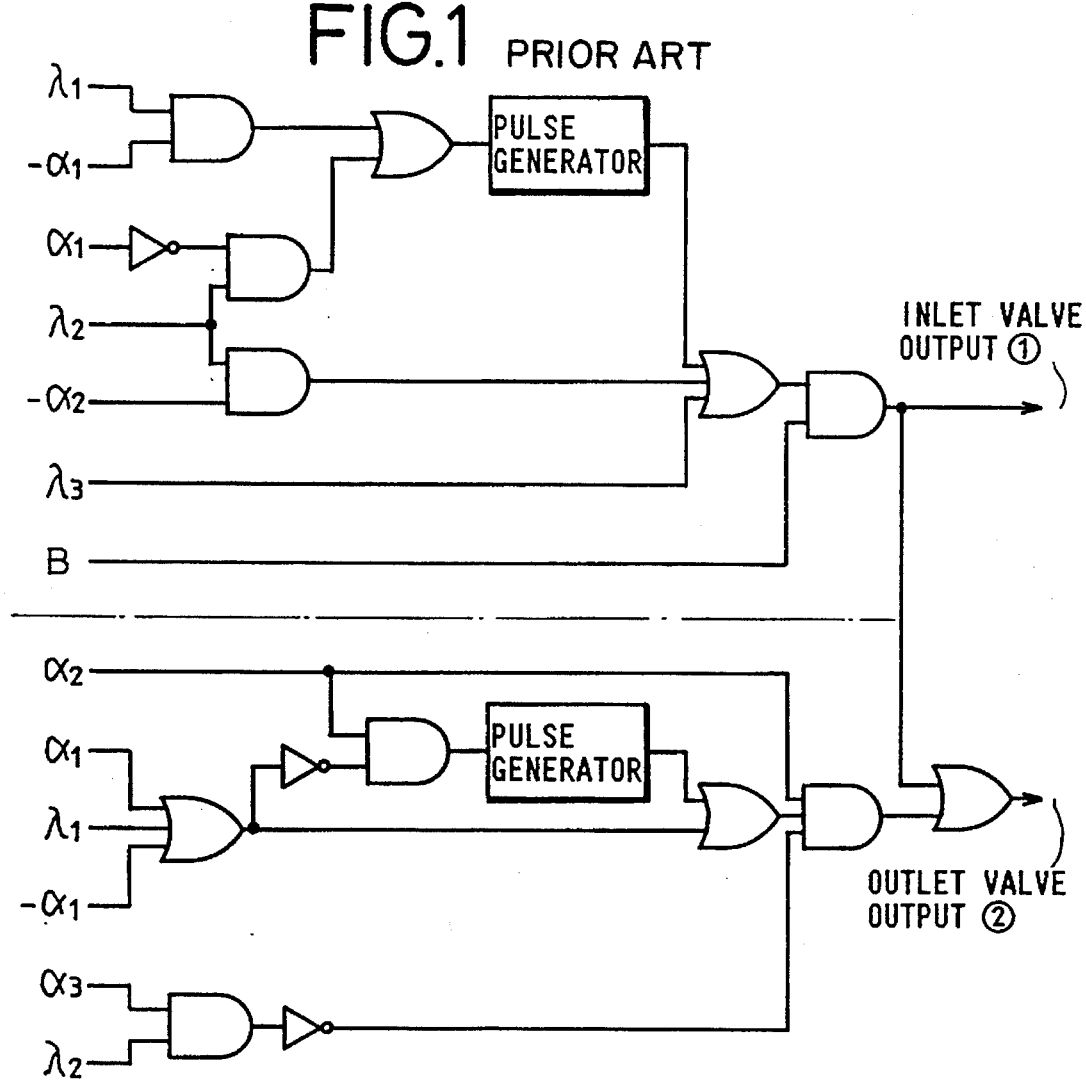

FIG.10

| λ \ α | NB | NM | NS | ZR | PS | PM | PB |
|---|---|---|---|---|---|---|---|
| Zero | PM | PM | PS | NS | NS | NM | NB |
| Small | PM | PM | PS | NS | NS | NM | NM |
| mid | PB | PB | PM | NS | ZR | ZR | ZR |
| big | PB | PB | PB | PM | PM | PM | ZR |

DECELERATION
NB: Negative Big
NM: Negative Midium
NS: Negative Small

ACCELERATION
PS: Positive Small
PM: Positive Midium
PB: Positive Big

ZR: Zero

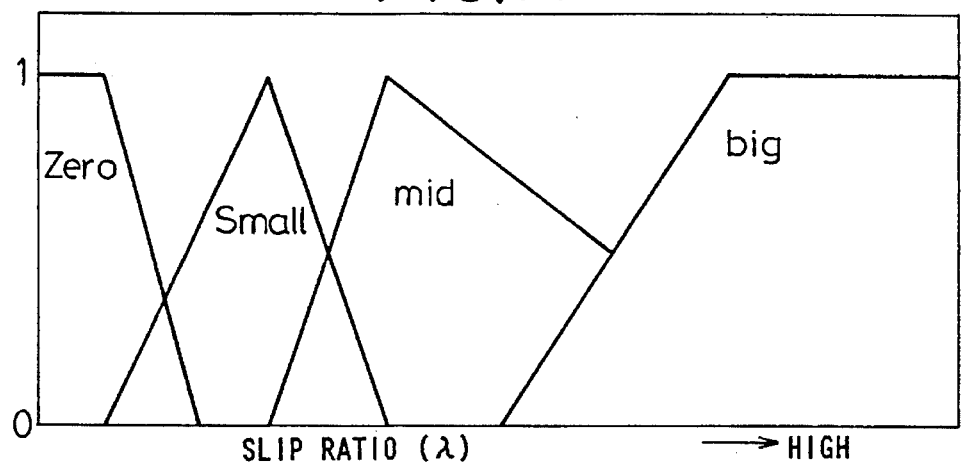
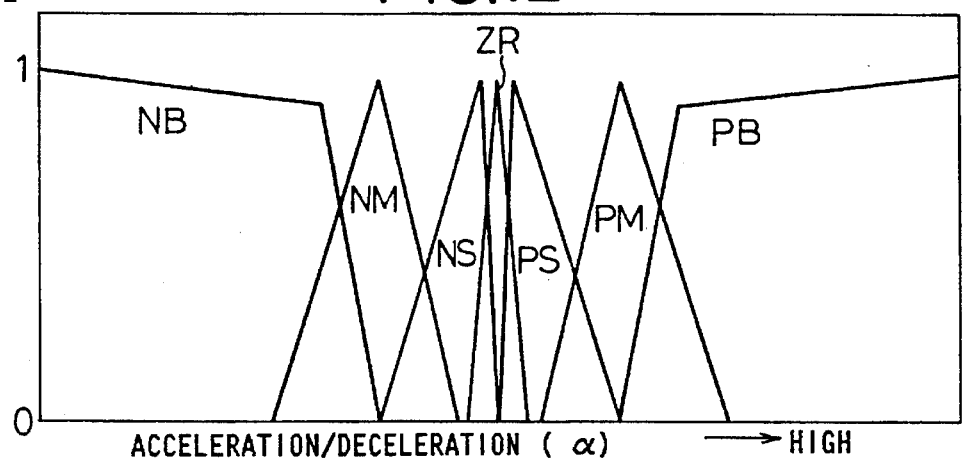

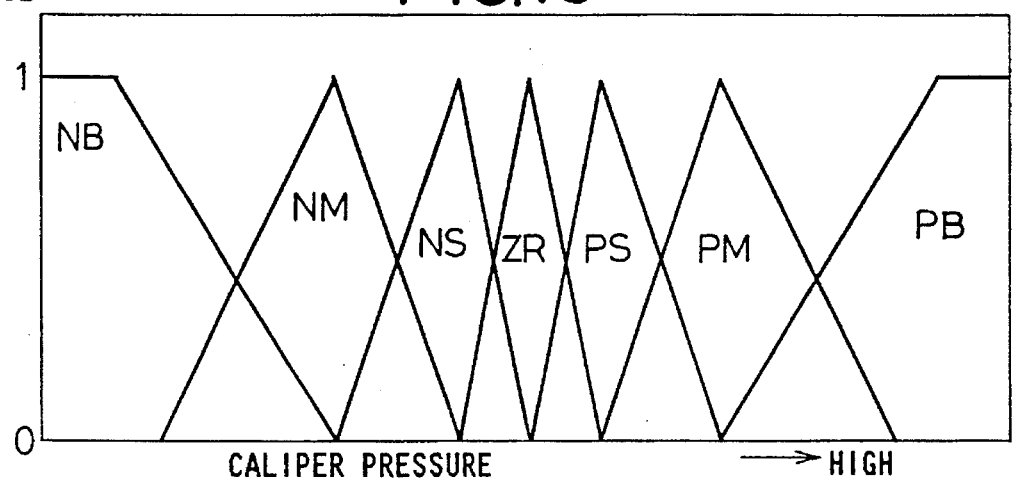

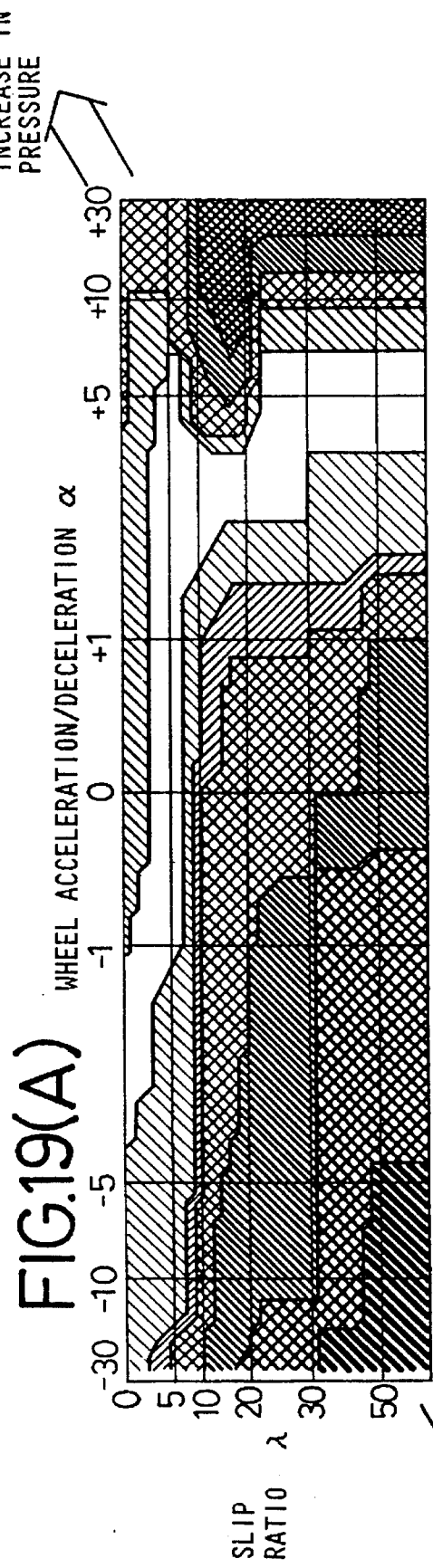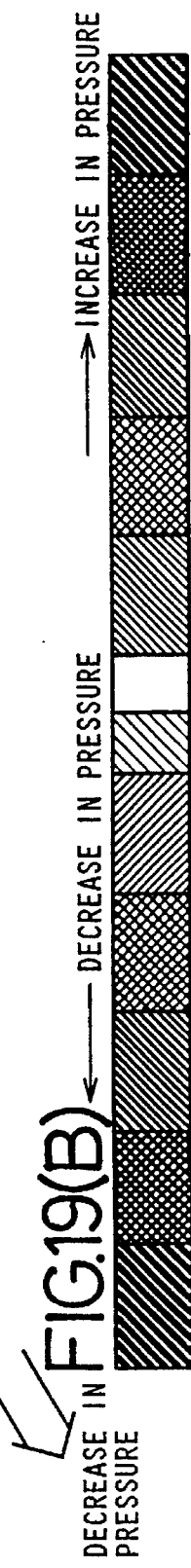
FIG.19(A)
FIG.19(B)

METHOD OF AND SYSTEM FOR CONTROLLING BRAKES

This application is a divisional of application Ser. No. 07/958,166 filed on Oct. 8, 1992, now U.S. Pat. No. 5,365,444, the entire contents of which are hereby incorporated by reference.

BACKGROUND OF THE INVENTION

1. Field of the Invention

The present invention relates to a method of and an apparatus for estimating a vehicle velocity, which are suitable for use in a vehicle having drive wheels and follower wheels, and to a method of and a system for controlling brakes, wherein when a braking force to be applied to each of the brakes is estimated from a wheel slip ratio and a wheel acceleration/deceleration so as to control each brake or when braking is changed from an antilock brake system (ABS) mode to normal braking, the optimum brake pressure increasing rate can be set upon increase in the brake pressure and the braking force can be controlled based on the optimum brake pressure increasing rate, thereby making it possible to ensure a feeling of satisfactory control.

2. Description of the Related Art

In a vehicle such as a motorcar, a motorcycle or the like, a so-called brake control system is used in which a speed or velocity of each wheel placed under braking is compared with a vehicle speed and controlling of brakes is effected based on the result of comparison. In the brake control system, a slip ratio is determined from the wheel velocity and the vehicle velocity. When the slip ratio reaches a target slip ratio or above, the slip ratio is reduced by decreasing brake hydraulic pressure, thereby producing the optimum braking force.

Further, a driving force control apparatus is known which controls a driving force of an engine by adjusting the ignition timing of the engine upon a vehicle rapid start or depending on a variation in a friction coefficient of a road surface, for example. Even in the case of the driving force control apparatus, the wheel velocity and the vehicle velocity are used as data.

Now, the wheel velocity, i.e., the rotational speed of each wheel can be directly detected by a sensor. It is however difficult to directly detect the vehicle velocity by a sensor. It is also next to impossible to detect the velocity of a vehicle such as a motorcycle whose weight and size are greatly restricted to accommodate the sensor therein. Accordingly, a method is normally used which estimates the vehicle velocity from the wheel velocity.

However, there is often a situation in which an estimated vehicle velocity is set to be larger or smaller than an actual vehicle velocity under the conditions in which each wheel slips against the road surface. In this case, the brake control system or the driving force control apparatus tend to effect unsuitable control.

A brake control system is known, in which a slip ratio of each wheel against a road surface is computed from the speed or velocity of a running vehicle and the rotational speed of each wheel and the optimum braking force is applied to the vehicle based on the computed slip ratio. As an example of such a system, a control logic circuit of which is shown in FIG. 1. In FIG. 1, each of an inlet valve and an outlet valve is a hydraulic control valve for controlling hydraulic pressure applied to a caliper cylinder (hereinafter called "caliper pressure") to operate a pair of calipers which hold each brake disk therebetween.

In the same drawing, each of $\lambda_1$, $\lambda_2$ and $\lambda_3$ represents a slip ratio of each wheel against the road surface. They have a relationship of $\lambda_1 < \lambda_2 < \lambda_3$. Each of $\alpha_1$, $\alpha_2$ and $\alpha_3$ represents a wheel acceleration and each of $-\alpha_1$ and $-\alpha_2$ represents a wheel deceleration. These values have a relationship of $-\alpha_2 < -\alpha_1 < 0 < \alpha_1 < \alpha_2 < \alpha_3$. Now, a parameter represented by $-\alpha_1$ and $-\alpha_2$ is changed from "0" to "1" when each of the wheel decelerations has reached a set value (threshold value) or less. Each of parameters other than the parameter referred to above is changed from "0" to "1" when each deceleration has reached the threshold value or more. In the case of the slip ratio, on the other hand, outputs appear on signal lines or conductors set by $\lambda_1$, $\lambda_2$ and $\lambda_3$ respectively when the slip ratio has reached each of given slip ratios ($\lambda_1$, $\lambda_2$ and $\lambda_3$) or above (threshold value or above). converting a brake operating instruction generated by the operation of a lever by a driver or the depression of a pedal by the driver into hydraulic pressure or power, an output hydraulic chamber which communicates with a caliper cylinder, for applying a braking force to a brake disk of each wheel (hereinafter called as "caliper force"), a cut valve for causing the input hydraulic chamber to communicate with the output hydraulic chamber and for cutting off the communication between the input and output hydraulic chambers, an expander piston disposed on the output hydraulic chamber side for closing the cut valve upon antilock braking and for increasing the volume of the output hydraulic chamber so as to reduce the hydraulic pressure or power, and a crank member held in abutment against the expander piston and rotatable by a rotative drive source.

In the modulator, the caliper pressure is reduced by displacing the expander piston so as to increase the volume of the output hydraulic chamber to avoid a locked state of each wheel upon braking. When the risk of the locked state is avoided, the expander piston is displaced to open the cut valve, thereby effecting normal braking.

In the prior art, however, when the braking is changed from the antilock braking to the normal braking, caliper pressure $P_c$ is abruptly raised toward master pressure $P_m$ developed in the master cylinder at the maximum pressure increasing rate as indicated by the broken line defined between Q and R in FIG. 3.

When a vehicle travels from a road surface having a low friction coefficient (hereinafter called a "low μ road") with respect to each wheel to a road surface having a high friction coefficient (hereinafter called a "high μ road") with respect to each wheel while the antilock control is being effected during the braking of the vehicle, the front wheel first comes across to the high μ road. Thus, a gripping force of the front wheel is raised so that the slip ratio is reduced, thereby enabling control for increasing the brake pressure. However, the rear wheel is still placed on the low μ road. Therefore, when the caliper pressure $P_c$ applied to the front wheel is simply raised at the maximum pressure increasing rate, the braking forces of the front and rear wheels against the road greatly differs from each other. This tends to hurt the control feeling. It is thus preferable to maintain the pressure increasing rate at a given value until the rear wheel reaches the high μ road.

A modulator provided with a double-structure type cut valve having a dual orifice defined therein is therefore known as has been disclosed in Japanese Patent Application Laid-Open Publication No. 49-15874 (which corresponds to U.S. Pat. No. 3,836,207). However, this modulator is also actuated by the pressure difference developed in hydraulic pressures, between the input hydraulic chamber and the output hydraulic chamber. Therefore, the pressure increasing rate is restricted and hence various pressure increasing rates suitable for the conditions of the road surface or the state of braking cannot be realized.

SUMMARY OF THE INVENTION

It is a principal object of the present invention to provide a method of and an apparatus for estimating a vehicle speed, which are suitable for use in a vehicle, wherein a desired vehicle speed required to control brakes and brake driving forces or the like can be estimated easily and with high accuracy.

It is another object of the present invention to provide a method of and a system for controlling brakes, wherein a braking force which is applied to each of the brakes can be easily and accurately estimated based on a wheel acceleration/deceleration and a slip ratio, thereby making it possible to effect the optimum brake control.

It is a further object of the present invention to provide a method of and a system for controlling brakes, wherein satisfactory control feeling can be reliably achieved without regard to the conditions of a road surface or the state of braking when an increase in a caliper pressure is effected.

It is still a further object of the present invention to provide a method of estimating a vehicle velocity, which is suitable for use in a vehicle, the method comprising the following steps: a first step of determining velocities of drive wheels and follower wheels of the vehicle, a second step of selecting the fastest one of the velocities determined in the first step, a third step of estimating the velocity of the vehicle based on the fastest wheel velocity selected in the second step, and a fourth step of repeatedly executing the first through third steps at given time intervals and setting the estimated vehicle velocity determined immediately before the third step as an estimated vehicle velocity to be determined in the fourth step when the estimated vehicle velocity determined in the third step is faster than the follower wheel velocities determined in the first step and lower than the fastest wheel velocity selected in the second step.

It is a still further object of the present invention to provide an apparatus for estimating a vehicle velocity, which is suitable for use in a vehicle. The apparatus comprises first wheel velocity detecting means for detecting velocities of drive wheels, second wheel velocity detecting means for detecting velocities of follower wheels, wheel velocity selecting means for selecting the fastest one of the respective wheel velocities detected by the first and second wheel velocity detecting means, vehicle velocity estimating means for estimating the velocity of the vehicle based on the fastest wheel velocity selected by the wheel velocity selecting means, vehicle velocity storing means for storing therein the vehicle velocity estimated by the vehicle velocity estimating means, and comparing means for comparing the vehicle velocity stored in the vehicle velocity storing means and the follower wheel velocities detected by the second wheel velocity detecting means. The vehicle velocity estimating means is activated to estimate a desired vehicle velocity supposing the amount of change of the estimated vehicle velocity into the high-velocity side to be zero when it is determined based on the result of comparison by the comparing means that the vehicle velocity is faster than the velocities of the follower wheels.

It is a still further object of the present invention to provide a method of controlling brakes, wherein the stability of running of a vehicle and the state of braking applied to the vehicle are controlled by adjusting caliper pressure according to the state of running of the vehicle. The method comprises the steps of determining slip ratios of wheels, determining accelerations and decelerations of the wheels, and estimating the amounts of increase and decrease in the caliper pressure from a membership function in which the determined slip ratios and the determined accelerations and decelerations are set as inputs.

It is a still further object of the present invention to provide a method of controlling brakes, wherein the membership function is changed depending on characteristics of tires fixed onto the wheels.

It is a still further object of the present invention to provide a method of controlling brakes, wherein the membership function is changed depending on the running stability of the vehicle.

It is a still further object of the present invention to provide a system for controlling brakes, wherein the stability of running of a vehicle and the state of braking applied to the vehicle are controlled by adjusting caliper pressure according to the state of running of the vehicle. The system comprises wheel acceleration/deceleration detecting means for detecting an acceleration and a deceleration of each wheel, slip ratio computing means for computing a slip ratio with respect to the surface of a road traveled by each wheel, storing means for storing a table therein as information, the table including the amounts of increase and decrease in the caliper pressure, which have been set so as to correspond to the value of the detected acceleration/deceleration and the value of the computed slip ratio, and caliper pressure controlling means for increasing and decreasing the caliper pressure according to the amounts of increase and decrease in the caliper pressure, which have been set based on the table from the wheel acceleration/deceleration and the slip ratio.

It is a still further object of the present invention to provide a system for controlling brakes, wherein the table is set based on membership functions corresponding to the wheel acceleration/deceleration and the slip ratio.

It is a still further object of the present invention to provide a system for controlling brakes, wherein the table is set so as to bring the value of the wheel acceleration/deceleration and the value of the slip ratio into high resolution in the vicinity of target values to which the wheel acceleration/deceleration and the slip ratio converge and so as to bring same into low resolution as the wheel acceleration/deceleration and the slip ratio are separated from the convergent target values.

It is a still further object of the present invention to provide a system for controlling brakes, wherein the table is set so as to bring the values of the slip ratio and the acceleration/deceleration into the low resolution along directions in which the absolute values of the slip ratio and the acceleration/ deceleration increase from 0 slip ratio and 0 wheel acceleration/deceleration respectively.

It is a still further object of the present invention to provide a method of controlling brakes, wherein caliper pressure is transmitted to a caliper cylinder from a master cylinder depending on an input supplied by operating a brake lever or a brake pedal or the like, thereby effecting normal braking for applying a braking force to each wheel, and a cut valve is displaced upward and downward by an expander piston movable in upward and downward directions by a driving means so as to be closed, thereby cutting off the caliper cylinder from communicating with the master cylinder and adjusting the volume of an output hydraulic chamber which communicates with the caliper cylinder so as to effect antilock braking for controlling the caliper pressure. The method comprises the steps of controlling the caliper pressure which is applied to each wheel to thereby effect the antilock braking, and moving the expander piston upward and downward upon the antilock braking so as to repeatedly open and close the cut valve at given time intervals, thereby increasing the caliper pressure at a target pressure increasing rate.

It is a still further object of the present invention to provide a method of controlling brakes, wherein caliper pressure is transmitted to a caliper cylinder from a master cylinder depending on an input supplied by operating a brake lever or a brake pedal or the like, thereby effecting normal braking for applying a braking force to each wheel, and a cut valve is displaced upward and downward by an expander piston movable in upward and downward directions by a driving means so as to be closed, thereby cutting off the caliper cylinder from communicating with the master cylinder and adjusting the volume of an output hydraulic chamber which communicates with the caliper cylinder so as to effect antilock braking for controlling the caliper pressure. The method comprises the following steps: a first step of detecting the state of input, a second step of detecting the state of a road surface, a third step of setting the rate of increase in the caliper pressure at the time of the antilock braking, based on the detected state of input and the detected state of road surface, and a fourth step of displacing the expander piston in accordance with the set pressure increasing rate so as to increase the caliper pressure.

It is a still further object of the present invention to provide a method of controlling brakes, wherein the second step includes a process for estimating the state of the road surface from a vehicle acceleration/deceleration.

The above and other objects, features and advantages of the present invention will become apparent from the following description and the appended claims, taken in conjunction with the accompanying drawings in which preferred embodiments of the present invention are shown by way of illustrative example.

BRIEF DESCRIPTION OF THE DRAWINGS

FIG. 1 is a view showing a conventional control logic circuit;

FIG. 2 is a view for describing control executed with respect to the outputs of the logic circuit shown in FIG. 1;

FIG. 10 is a view for describing a fuzzy map employed in the brake control method according to the present invention;

FIG. 11 is a view for describing a membership function of a slip ratio;

FIG. 12 is a view for describing a membership function of an acceleration/deceleration;

FIG. 13 is a view for describing a membership function of caliper pressure;

FIGS. 19(A) and 19(B) are the views for describing a table employed in the brake control system shown in FIG. 18;

FIG. 22b is a view for describing the relationship between a slip ratio and the amount of increase and/or decrease in caliper pressure, the view being illustrated as a comparative example of the view depicted in FIG. 22a;

DETAILED DESCRIPTION OF THE PREFERRED EMBODIMENTS

A method of and an apparatus for estimating a vehicle speed or velocity, according to the present invention, which are suitable for use in a vehicle, will hereinafter be described in detail with reference to the accompanying drawings in which preferred embodiments are shown by way of illustrative example.

Figure 3:
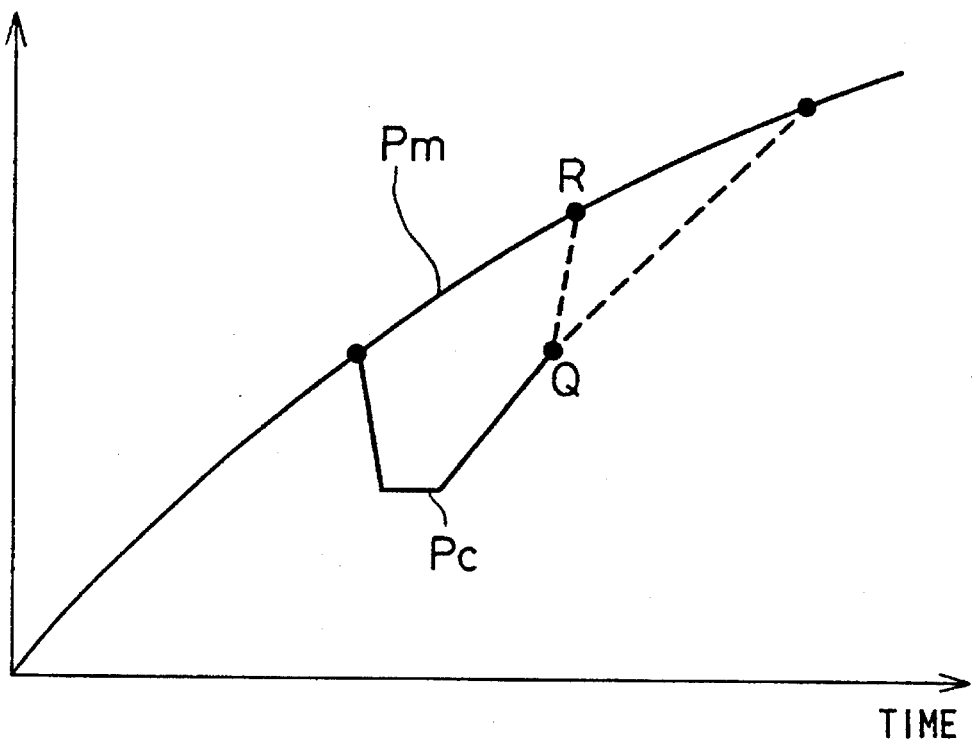
FIG. 3 is a view for describing a caliper pressure increasing rate employed in a brake control method according to a prior art.
Figure 4:
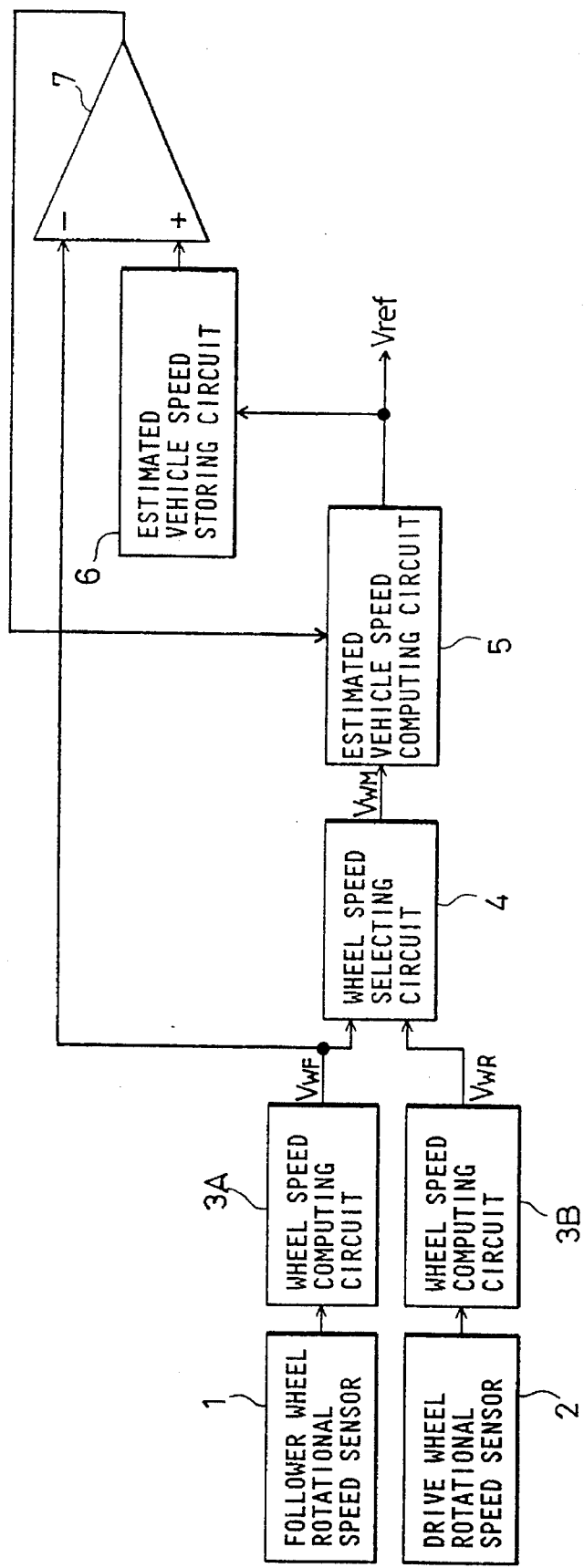
FIG. 4 is a block diagram showing the structure of a vehicle speed estimating apparatus according to the present invention, which is suitable for use in a vehicle.

FIG. 4 is a block diagram showing a vehicle speed estimating apparatus according to the present embodiment. The vehicle speed estimating apparatus comprises a follower wheel rotational speed sensor 1 for detecting the rotational speed or velocity of each follower wheel (e.g. a front wheel of a motorcycle, i.e. a 2-wheeled automotive vehicle), a drive wheel rotational speed sensor 2 for detecting the rotational speed or velocity of each drive wheel (e.g. a rear wheel of the motorcycle), wheel speed computing circuits 3A, 3B for computing wheel speeds or velocities based on signals outputted from the follower wheel rotational speed sensor 1 and the drive wheel rotational speed sensor 2 respectively, a wheel speed selecting circuit (wheel speed selecting means) 4 for selecting the fastest wheel velocity from the wheel velocities which have been computed by the wheel speed computing circuits 3A, 3B, an estimated vehicle speed computing circuit (vehicle speed estimating means) 5 for computing an estimated vehicle speed or velocity based on the wheel velocity which has been selected by the wheel speed selecting circuit 4, an estimated vehicle speed storing circuit (vehicle speed storing means) 6 for storing the computed estimated vehicle speed therein as data, and a comparator (comparing means) 7 for comparing the estimated vehicle speed stored in the estimated vehicle speed storing circuit 6 with each follower wheel velocity computed by the wheel speed computing circuit 3A. In this case, the output of the comparator 7 is used to control the estimated vehicle speed computing circuit 5.

Incidentally, the follower wheel rotational speed sensor 1 and the wheel speed computing circuit 3A serve as a first wheel speed detecting means, whereas the drive wheel rotational speed sensor 2 and the wheel speed computing circuit 3B serve as a second wheel speed detecting means.

The vehicle speed estimating apparatus according to the present embodiment is basically constructed as described above. A description will now be made of a method of estimating the speed or velocity of a motorcycle, for example, which is carried out by the vehicle speed estimating apparatus.

First of all, during a period in which the motorcycle is running, the follower wheel rotational speed sensor 1 and the drive wheel rotational speed sensor 2 respectively detect the rotational speeds of the front and rear wheels as pulses outputted from a rotary encoder or the like, for example, and output same to the corresponding wheel speed computing circuits 3A, 3B. The wheel speed computing circuits 3A, 3B compute a follower wheel speed or velocity $V_{WF}$ and a drive wheel speed or velocity $V_{WR}$ in response to the pulses inputted from the follower wheel rotational speed sensor 1 and the drive wheel rotational speed sensor 2 respectively, and output the velocities thus computed to the wheel speed selecting circuit 4 as data. Incidentally, the wheel velocities $V_{WF}$, $V_{WR}$ can be obtained by counting the number of pulses outputted from the follower wheel rotational speed sensor 1 and the drive wheel rotational speed sensor 2 and converting same into the peripheral speeds of the wheels.

The wheel speed selecting circuit 4 then selects the fastest wheel velocity from the wheel velocities $V_{WF}$, $V_{WR}$ and outputs it to the estimated vehicle speed computing circuit 5 as a wheel velocity $V_{WM}$. That is, this selection is made because the fastest wheel velocity approaches an actual vehicle speed provided that a slip ratio of each wheel against a road surface is less than or equal to 0.

The estimated vehicle speed computing circuit 5 basically computes an estimated vehicle speed or velocity $V_{ref}$ for each given computing period or cycle (3 ms, for example) in the following manner.

Assuming that the motorcycle is not decelerated at −9.8 m/s² (−1G) or below and not accelerated at +29.4 m/s² (+3G) or more, the estimated vehicle speed computing circuit 5 sets a lower limit deceleration $G_{DEC}$ and an upper limit acceleration $G_{ACC}$ as follows:

$$G_{DEC}=-9.8 \ m/s^2 \tag{1}$$

$$G_{ACC}=+29.4 \ m/s^2 \tag{2}$$

When a wheel acceleration $dV_{WM(n)}/dt$ falls within a range of from above $G_{DEC}$ to below $G_{ACC}$, an estimated vehicle velocity $V_{ref(n)}$ is determined as follows:

$$V_{ref(n)}=V_{WM(n)} \tag{3}$$

where (n) represents a value obtained upon execution of an nth computation.

When the wheel acceleration $dV_{WM}(n)/dt$ is reduced at the low limit deceleration of $G_{DEC}$ or below, the estimated vehicle velocity $V_{ref(n)}$ is determined as follows:

$$V_{ref(n)}=V_{ref(n-1)}-\Delta G_{DEC} \tag{4}$$

where $V_{ref(n-1)}$ represents an estimated vehicle velocity in the previous computing cycle and $\Delta G_{DEC}$ represents a lower limit deceleration corresponding to the given computing cycle $\Delta t$, i.e. $\Delta G_{DEC} = G_{DEC} \times \Delta t$. This equation (4) represents that the estimated vehicle velocity $V_{ref}$ is set to the lower limit deceleration $G_{DEC}$ when the wheel velocity $V_{WM(n)}$ is reduced at the low limit deceleration of $G_{DEC}$ or below.

Similarly, when the wheel acceleration $dV_{WM(n)}/dt$ is increased at the upper limit acceleration of $G_{ACC}$ or above, the estimated vehicle velocity $V_{ref(n)}$ is determined as follows:

$$V_{ref(n)} = V_{ref(n-1)} + \Delta G_{ACC} \quad (5)$$

where $\Delta G_{ACC}$ represents an upper limit acceleration corresponding to the given computing cycle $\Delta t$, i.e. $\Delta G_{ACC} = G_{ACC} \times \Delta t$. This equation (5) shows that the estimated vehicle velocity $V_{ref}$ is set to the upper limit acceleration $G_{ACC}$ when the wheel velocity $V_{WM(n)}$ is increased at the upper limit acceleration of $G_{ACC}$ or above.

Figure 5:
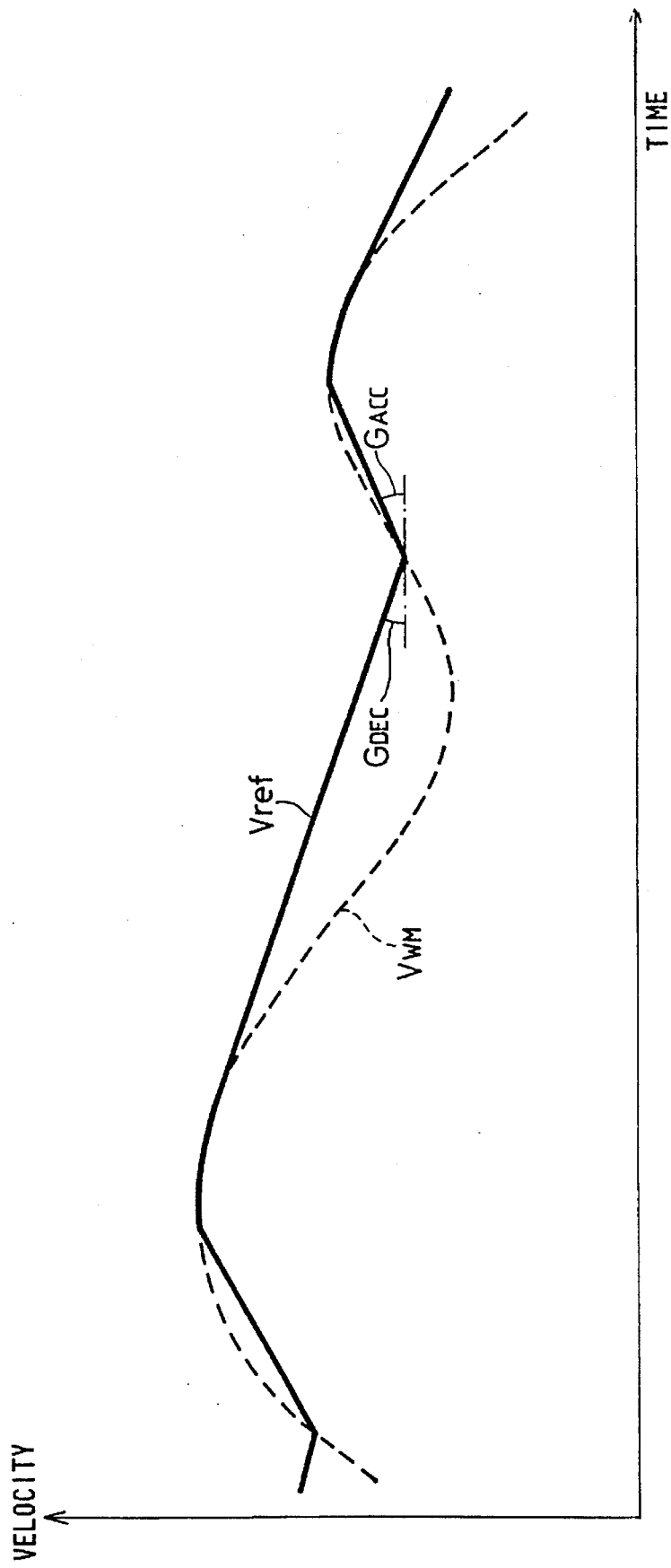
FIG. 5 is a view for describing the relationship between a wheel speed selected by a wheel speed selecting circuit of the apparatus shown in FIG. 4 and an estimated vehicle speed determined from a basic computing process of an estimated vehicle speed computing circuit.

FIG. 5 shows the estimated vehicle velocity $V_{ref}$ determined based on the above equations (3), (4) and (5) when the wheel velocity $V_{WM}$ indicated by the dashed line is given by the wheel speed selecting circuit 4.

In the present embodiment, the estimated vehicle velocity $V_{ref}$ determined in the above-described manner is further corrected by comparing with the follower wheel velocity $V_{WF}$. This process will be described below with reference to FIG. 6.

Figure 6:
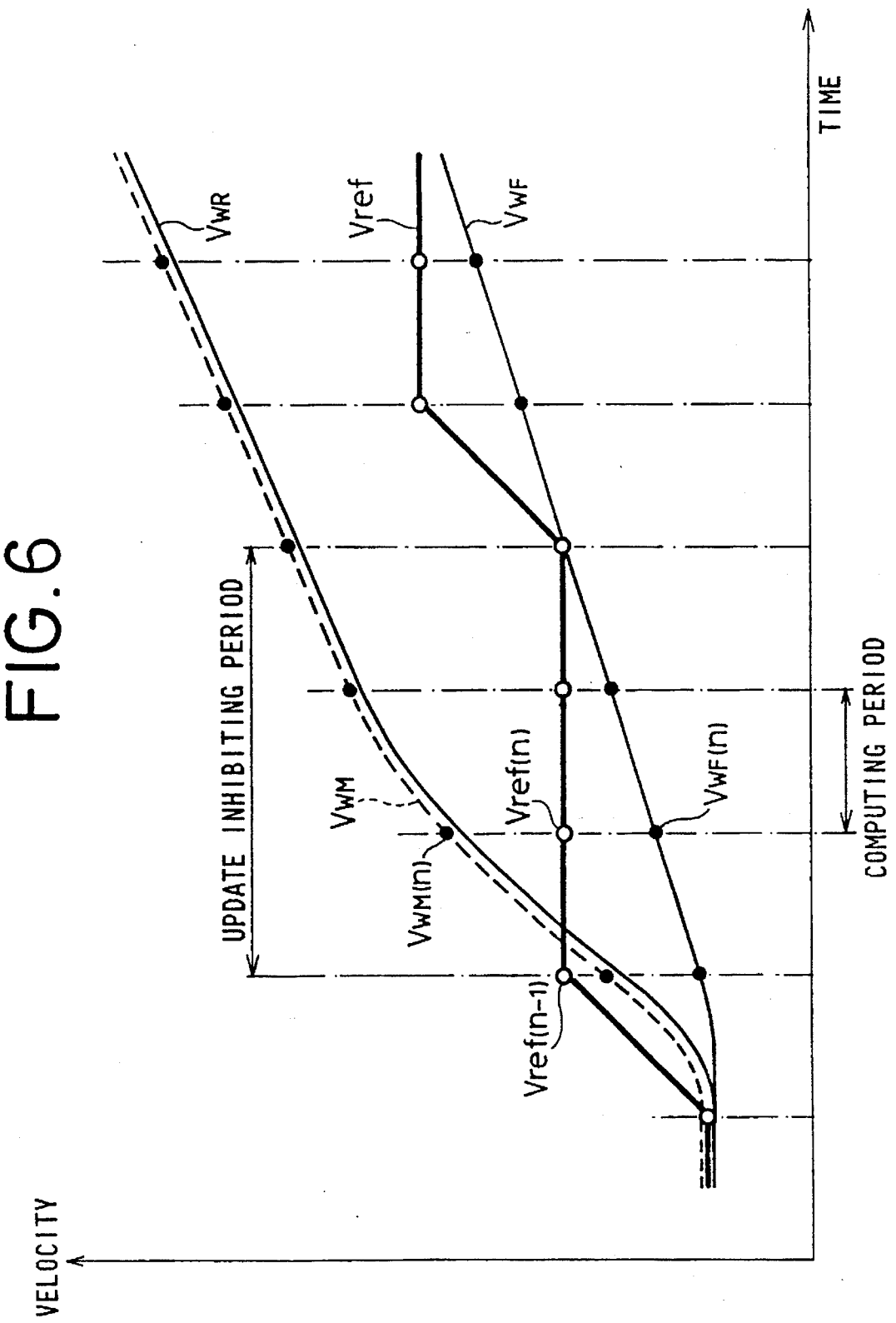
FIG. 6 is a view for describing the relationship between the speed of a follow-up wheel, the speed of a drive wheel, a selected wheel speed and a vehicle speed estimated and corrected based on these speeds, all of which are determined by the apparatus shown in FIG. 4.

FIG. 6 shows a case in which the acceleration is made by increasing a driving force of a motorcycle's engine. The velocity $V_{WR}$ of the rear wheel, which serves as the drive wheel, abruptly increases with respect to the velocity $V_{WF}$ of the front wheel which serves as the follower wheel because the rear wheel is brought to an idle running state upon its initial acceleration. At this time, the wheel speed selecting circuit 4 selects the fastest wheel velocity from $V_{WR}$, $V_{WF}$ and outputs the velocity $V_{WR}$ of the drive wheel to the estimated vehicle speed computing circuit 5 as the wheel velocity $V_{WM}$. When, on the other hand, the estimated vehicle speed computing circuit 5 computes the estimated vehicle velocity $V_{ref}$ based on the wheel velocity $V_{WM}$ as it is, the estimated vehicle velocity $V_{ref}$ different from an actual vehicle velocity is obtained.

Thus, in the present embodiment, the estimated vehicle velocity $V_{ref(n-1)}$ obtained by the previous computation is temporarily stored in the estimated vehicle speed storing circuit 6 as data. Then, the estimated vehicle velocity $V_{ref(n-1)}$ is compared with a follower wheel velocity $V_{WF(n)}$ for the present computation in the comparator 7 to thereby correct the estimated vehicle velocity $V_{ref(n)}$.

That is, the comparator 7 compares the follower wheel velocity $V_{WF(n)}$ and the estimated vehicle velocity $V_{ref(n-1)}$. If the following condition is satisfied, then a signal for inhibiting the estimate vehicle velocity $V_{ref}$ from being brought up to date is outputted to the estimated vehicle speed computing circuit 5.

$$V_{ref(n-1)} > V_{WF(n)} \text{ and } V_{ref(n-1)} > V_{WN(n)} \quad (6)$$

Accordingly, the estimated vehicle speed computing circuit 5 outputs an estimated vehicle velocity $V_{ref(n)}$ identical to the previous estimated vehicle velocity $V_{ref(n-1)}$. The estimated vehicle velocity $V_{ref}$ thus computed is shown in FIG. 6.

When the drive wheel velocity $V_{WR}$ is greater than the follower wheel velocity $V_{WF}$, the estimated vehicle velocity $V_{ref}$ is changed so as to follow the follower wheel velocity $V_{WF}$ without following the fastest wheel velocity. This is because the follower wheel can provide less slip on a road surface, thereby making it possible to obtain the estimated vehicle velocity $V_{ref}$ close to the actual vehicle velocity. As a result, the estimated vehicle velocity $V_{ref}$ can be computed with higher accuracy.

Figure 7:
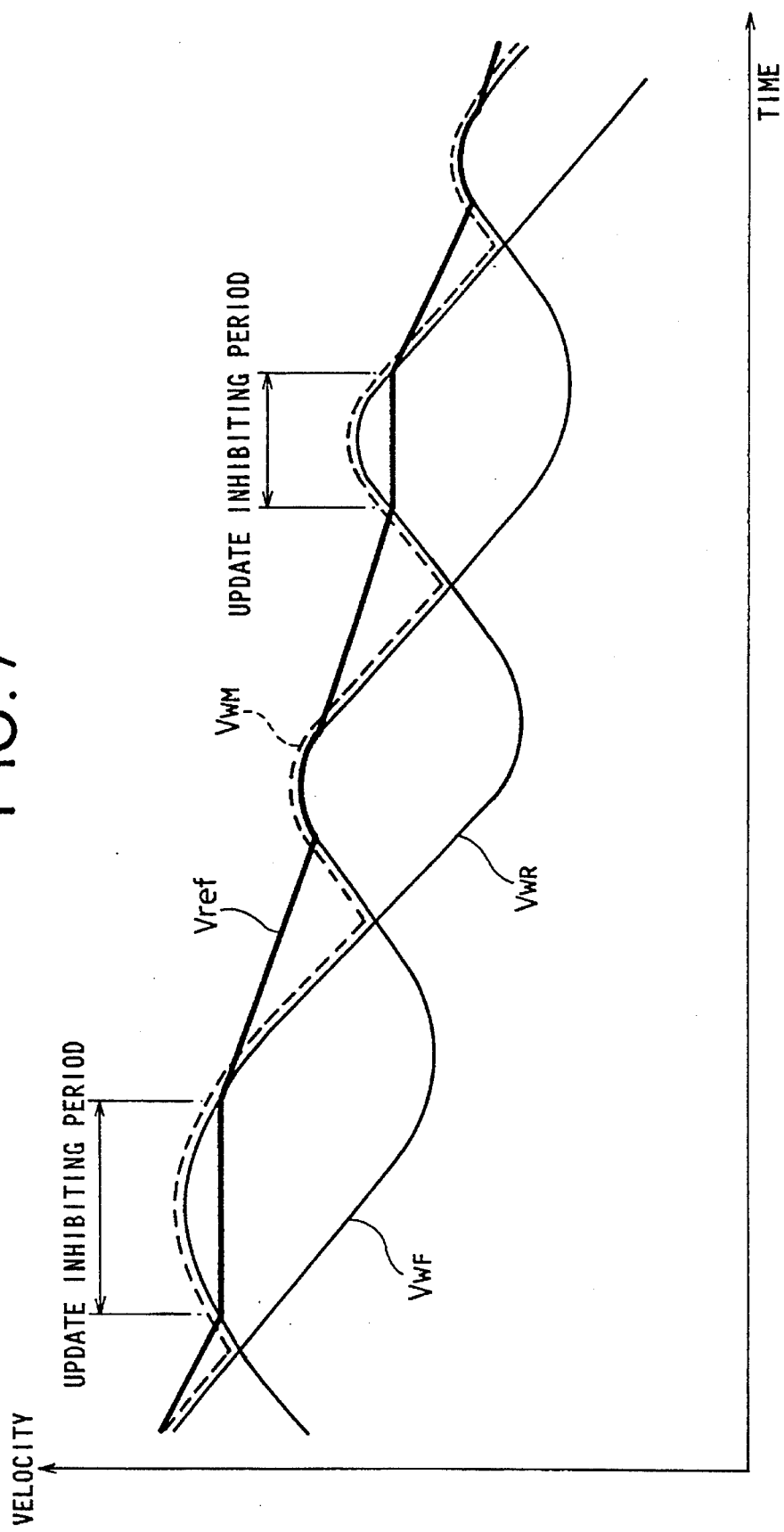
FIG. 7 is a view for describing the relationship between the speed of the follow-up wheel, the speed of the drive wheel, the selected wheel speed and the vehicle speed estimated and corrected based on these speeds, all of which are determined by the apparatus shown in FIG. 4 upon brake control.

FIG. 7 is a view illustrating the relationship between the follower wheel velocity $V_{WF}$, the drive wheel velocity $V_{WR}$ and the estimated vehicle velocity $V_{ref}$ computed in accordance with the present embodiment at the time that the brake control system is in operation. The brake control system determines a slip ratio from the estimated vehicle velocity $V_{ref}$ and the wheel velocity $V_{WF}$ or $V_{WR}$ and adjusts a braking force so as to avoid an increase in the slip ratio, thereby effecting decelerating control. Thus, each of the wheel velocities $V_{WF}$, $V_{WR}$ is of a substantially vibration type as illustrated in FIG. 7. Further, the wheel velocity $V_{WM}$, which has been selected by the wheel speed selecting circuit 4, is represented as indicated by the dashed line in FIG. 7. On the other hand, the computed estimated vehicle velocity $V_{ref}$ is represented as indicated by the solid line in FIG. 7 seeing it in broad perspective on the analogy of FIG. 6. Incidentally, the estimated vehicle velocity $V_{ref}$ is updated again upon its deceleration. It is therefore possible to obtain the estimated vehicle velocity $V_{ref}$ similar to that shown in FIG. 6.

Thus, the estimated vehicle velocity $V_{ref}$ closest to the actual vehicle velocity can be obtained. It is therefore possible to stably and reliably effect the brake control, for example. The driving force can also be accurately controlled in addition to the appropriate brake control. Further, since the control referred to above can be realized with an extremely simple arrangement, the capacity of a program can be reduced and a high-speed computation can be effected. It is thus possible to execute computations at a shorter computing cycle or period and to achieve an improvement in accuracy.

A description will now be made of a second embodiment which shows a case in which processing time can be reduced by a brake control method for controlling brake pressure so as to obtain the optimum braking force.

Figure 9:
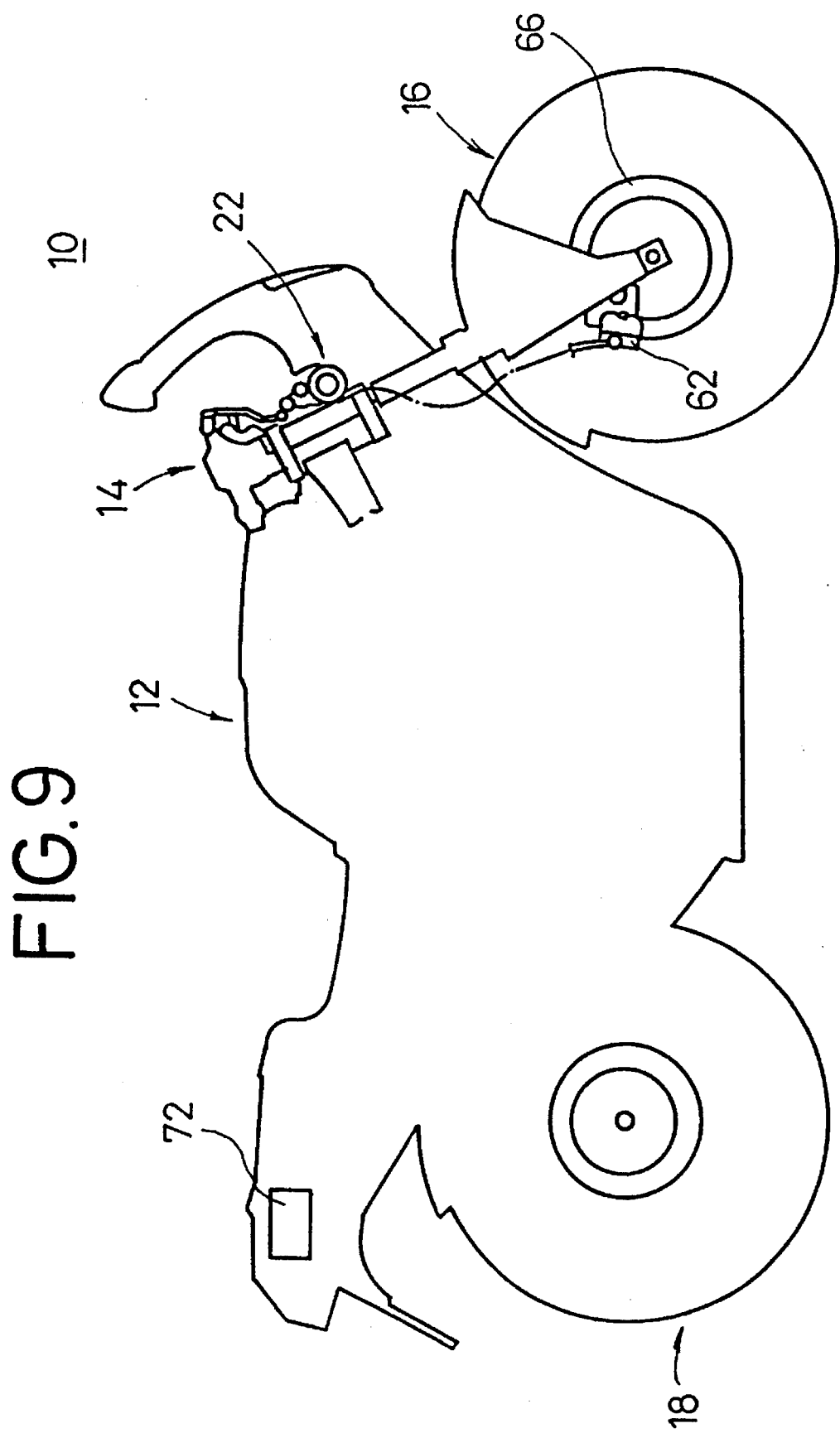
FIG. 9 is a schematic exterior view depicting a motorcycle in which the brake control system shown in FIG. 8 is to be incorporated.

Referring to FIG. 9, reference numeral 10 designates a 2-wheeled automotive vehicle, i.e., a motorcycle. The motorcycle 10 comprises a main body 12, a handle 14, a front wheel 16 and a rear wheel 18.

Figure 8:
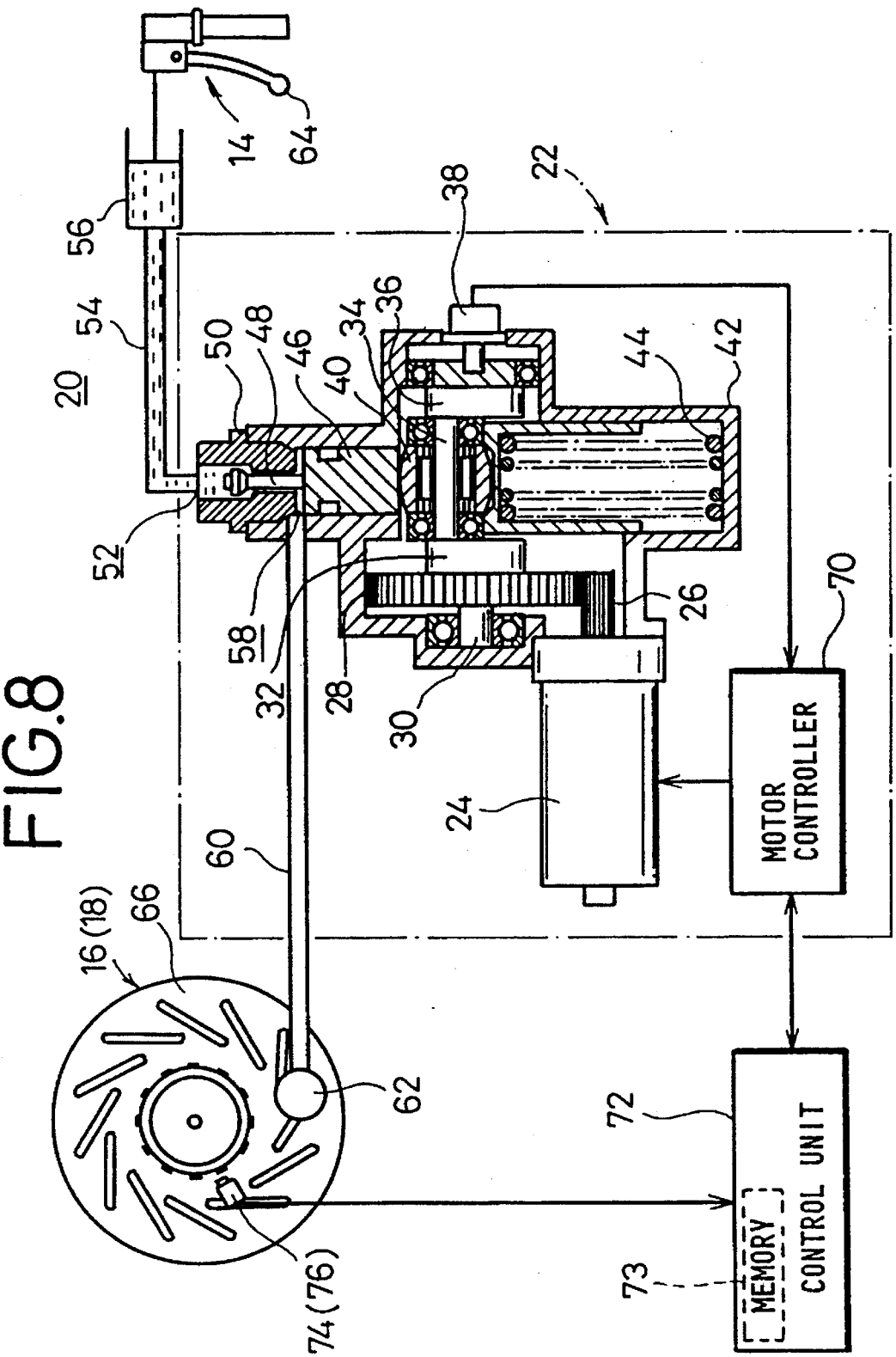
FIG. 8 is a schematic view illustrating the structure of a system for effecting a brake control method according to the present invention.

A brake control system 20 for carrying out the brake control method according to the present embodiment is mounted to the motorcycle 10. As shown in FIG. 8, the brake control system 20 is provided with an antilocking modulator 22. A pinion 26 is rotatably mounted to a d.c. motor 24 of the modulator 22 and maintained in meshing engagement with a gear 28. The gear 28 is supported by a crank shaft 30 to which one end of a crank pin 34 is eccentrically coupled via a crank arm 32. A potentiometer 38, which serves as a means for detecting the position of an expander piston (which will be described later), is attached to the other end of the crank pin 34 via a crank arm 36.

A cam bearing 40 is rotatably mounted on the crank pin 34. The lower end of the cam bearing 40 is always pressed toward an upper limit position under the action of return springs 44 accommodated in a spring holder 42. The expander piston 46 is brought into abutment against the upper end of the cam bearing 40 and displaced in upward and downward directions in response to an up-and-down movement of the cam bearing 40 so as to open and close a cut valve 48.

A cut valve holder 50 having the cut valve 48 incorporated therein is provided above the expander piston 46. A master cylinder 56 is connected via a passage 54 to an input port 52 of the cut valve holder 50. On the other hand, a wheel braking caliper cylinder 62 is connected via a passage 60 to an output port 58 of the cut valve holder 50. The master cylinder 56 and the caliper cylinder 62 are interconnected with each other via the passage 54, the modulator 22 and the passage 60. This path is filled with oil for the hydraulic pressure. The master cylinder 56 is actuated to adjust the hydraulic pressure under the action of a brake lever 64 so as to cause the cut valve 48 to actuate the caliper cylinder 62, thereby applying a braking force to a disk plate 66 attached to each of the front wheel 16 and the rear wheel 18.

A motor controller 70 is electrically connected to the potentiometer 38 and the d.c. motor 24. The motor controller 70 is also electrically connected to a control unit 72. The control unit 72 is provided with a memory 73. A fuzzy map in which a wheel slip ratio ($\lambda$) and a wheel acceleration/deceleration ($\alpha$) are defined as inputs and caliper pressure is defined as an output, is stored in the memory 73 as data (see FIG. 10). The fuzzy map has been previously created based on a slip ratio vs. membership value function, i.e., a membership function (see FIG. 11) of a slip ratio ($\lambda$), a membership function (see FIG. 12) of an acceleration/deceleration ($\alpha$), and a membership function (see FIG. 13) of caliper pressure.

Each of wheel speed sensors 74, 76 for detecting the speeds of the front and rear wheels 16, 18 respectively, which have been attached to the corresponding disk plates 66, is electrically connected to the control unit 72.

The operation of the brake control system 20 constructed as described above will now be described in connection with the brake control method according to the present embodiment.

Upon normal braking, the crank pin 34 is maintained at a predetermined upper limit position by resilient forces of the return springs 44 so as to cause the cam bearing 40 mounted on the crank pin 34 to hold the expander piston 46 in a forced-up state. Thus, the cut valve 48 is forced up by the expander piston 46 to thereby enable the input port 52 to communicate with the output port 58.

The master cylinder 56 is then actuated by gripping the brake lever 64. Brake hydraulic pressure generated by the master cylinder 56 is transmitted to the caliper cylinder 62 through the passage 54, the input port 52, the output port 58 and the passage 60 in that order, thereby applying a caliper force to the disk plate 66.

When the control unit 72 then supplies a drive signal to the motor controller 70 to effect the brake control, the motor controller 70 controls the direction and amount of rotation of the d.c. motor 24. Therefore, the pinion 26 mounted on an unillustrated rotatable shaft is rotated to turn both the gear 28 held in meshing engagement with the pinion 26 and the crank arm 32 fixedly mounted to the gear 28 via the crank shaft 30, thereby displacing the crank pin 34 mounted to the crank arm 32 from the upper limit position to the lower limit position. Thus, the cam bearing 40 is lowered under the displacement action of the crank pin 34, so that the brake hydraulic pressure which acts on the expander piston 46, is added to the torque of the d.c. motor 24. Therefore, the expander piston 46 is pressed against the cam bearing 40 so as to be promptly lowered.

When the expander piston 46 is lowered a predetermined amount, the cut valve 48 is seated to thereby block or cut off the communication between the input port 52 and the output port 58. Thus, when the expander piston 46 is further lowered singly, the volume on the output port 58 side increases so as to decrease the hydraulic pressure applied to the caliper cylinder 62, thereby reducing a caliper force which is applied to the front wheel 16, for example.

When, for example, an acceleration/deceleration ($\alpha$) of the front wheel 16 is detected based on the output of the wheel speed sensor 74 attached to the disk plate 66 of the front wheel 16, a process for determining to which one of sets expressed by the membership function shown in FIG. 12 the acceleration/deceleration ($\alpha$) corresponds is effected. Further, a slip ratio ($\lambda$) at this time is computed. Thereafter, a process for determining to which one of sets expressed by the membership function shown in FIG. 11 the computed slip ratio ($\lambda$) corresponds is effected. Next, desired caliper pressure is directly estimated from the fuzzy map shown in FIG. 10 with the results of determination being regarded as inputs. If the slip ratio ($\lambda$) is "Zero"0 and the acceleration/deceleration ($\alpha$) is "NB(Negative Big)", for example, then a signal indicative of control information that "Set the caliper pressure to "PM(Positive Medium)" is outputted.

Figure 14:
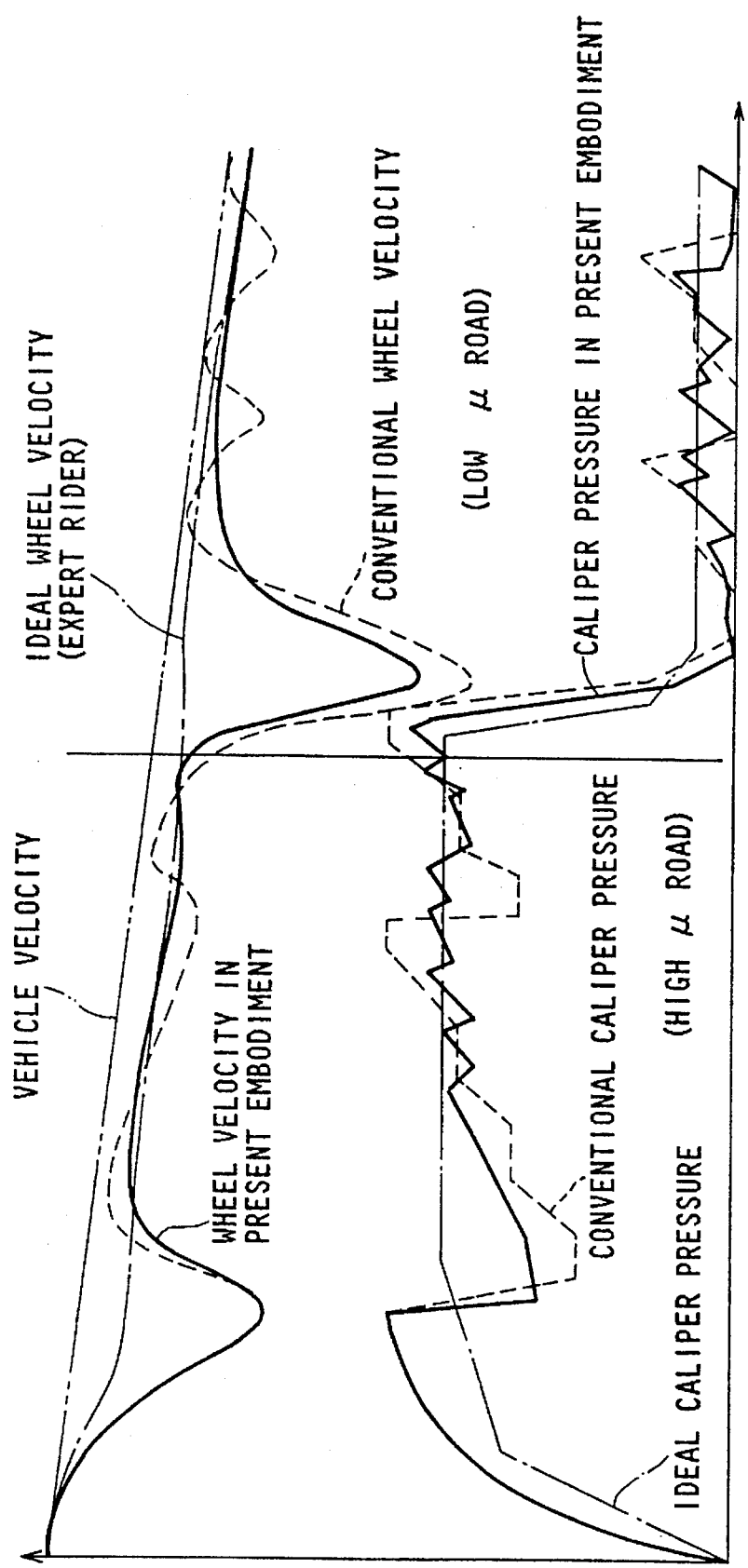
FIG. 14 is a view for describing the relationship between a wheel speed and caliper pressure both employed in the present invention and those employed in the prior art.

Accordingly, the caliper pressure is directly estimated from the slip ratio ($\lambda$) and the acceleration/deceleration ($\alpha$) in the present embodiment. Therefore, any complicated computing process and control are unnecessary and the caliper pressure can be promptly and smoothly obtained, thereby enabling the optimum brake control. Further, since the caliper pressure is estimated using the membership function, the brake control can be smoothly performed without being affected by an abrupt change in a friction coefficient of a road surface. That is, as illustrated in FIG. 14, control based on a wheel speed curve approximate to an ideal wheel speed curve created under the experience of an expert rider can be performed. Thus, the brake control, which can ensure a stable deceleration and provide less vehicle behavior as compared with the conventional brake control, can be effected.

Figure 15:
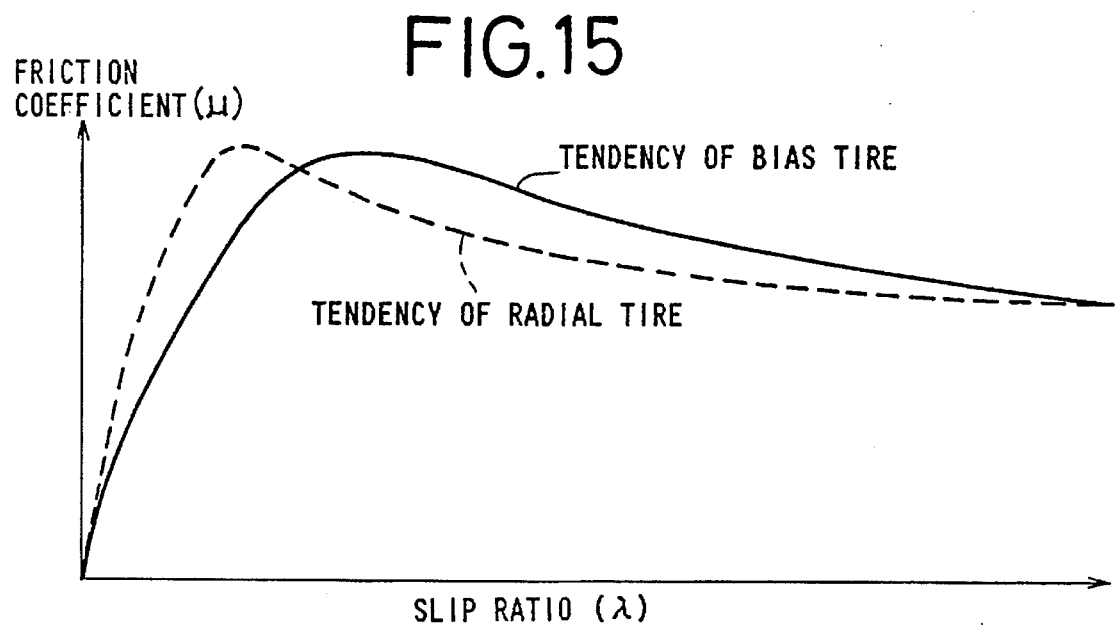
FIG. 15 is a view for describing characteristics of different tires.
Figure 16:
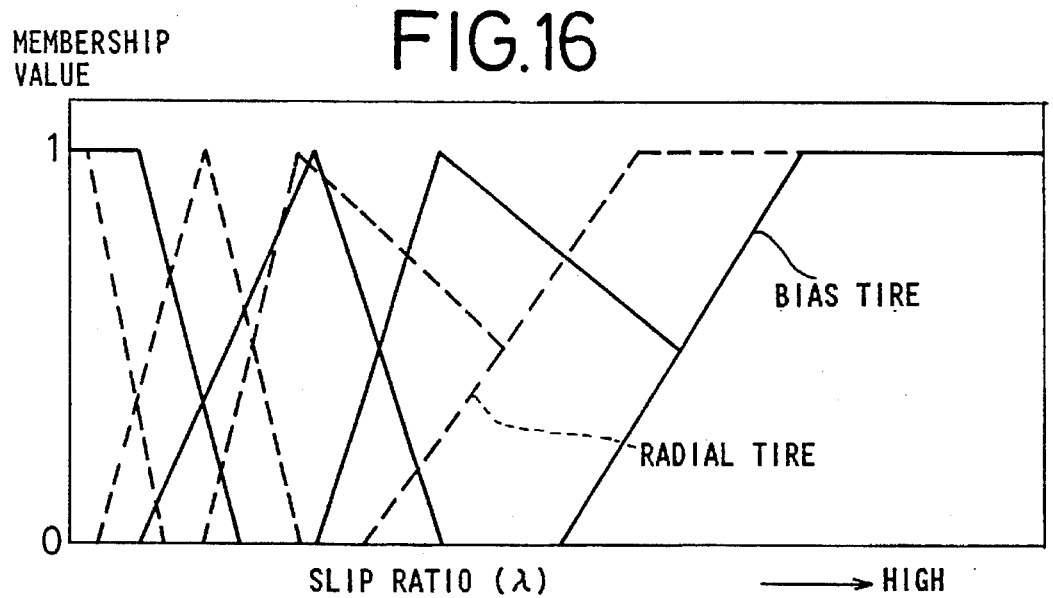
FIG. 16 is a view for describing a membership function of a slip ratio, based on the characteristics of the different tires.

In the present embodiment as well, the brake control can be easily performed even if tire characteristics differ from each other. A characteristic curve of a radial tire, which is indicated by the broken line in FIG. 15, represents that the peak of a friction coefficient ($\mu$) exists on the low slip ratio ($\lambda$) side as compared with a characteristic curve of a bias tire, which is indicated by the solid line in FIG. 15. In this case, it is simply necessary to move a membership function of a slip ratio ($\lambda$) from the position indicated by the solid line (bias tire) to the position indicated by the dashed line (radial tire) and to create a fuzzy map based on the membership function thus processed, as shown in FIG. 16.

Figure 17:
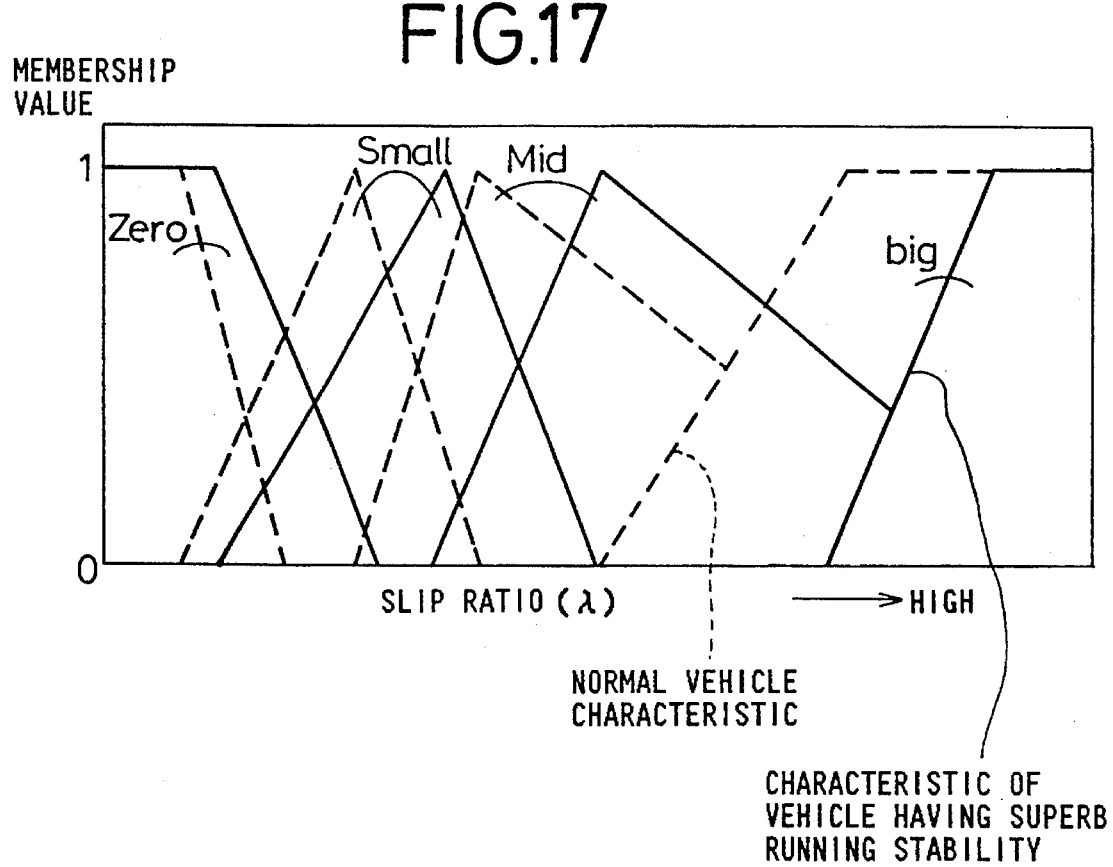
FIG. 17 is a view for describing a membership function of a slip ratio, based on characteristics of a vehicle having excellent running stability and normal vehicle characteristics.

When the tire characteristics are identical to each other and a characteristic of a vehicle having excellent running stability is included, a membership function of a slip ratio ($\lambda$) (see the solid line in FIG. 17) is set to a position (slip ratio increasing position) moved to the right from a membership function of a slip ratio ($\lambda$) (see the dashed line in FIG. 17) at the time that a normal vehicle characteristic is included. It is therefore possible to effect an improvement in braking performance with great ease.

Next, a system capable of accurately controlling brakes without increasing the storage capacity, which will be illustrated as a third embodiment, will hereinafter be described in detail with reference to the accompanying drawings. Incidentally, the same elements of structure as those employed in the second embodiment are identified by like reference numerals and their detailed description will therefore be omitted.

Figure 18:
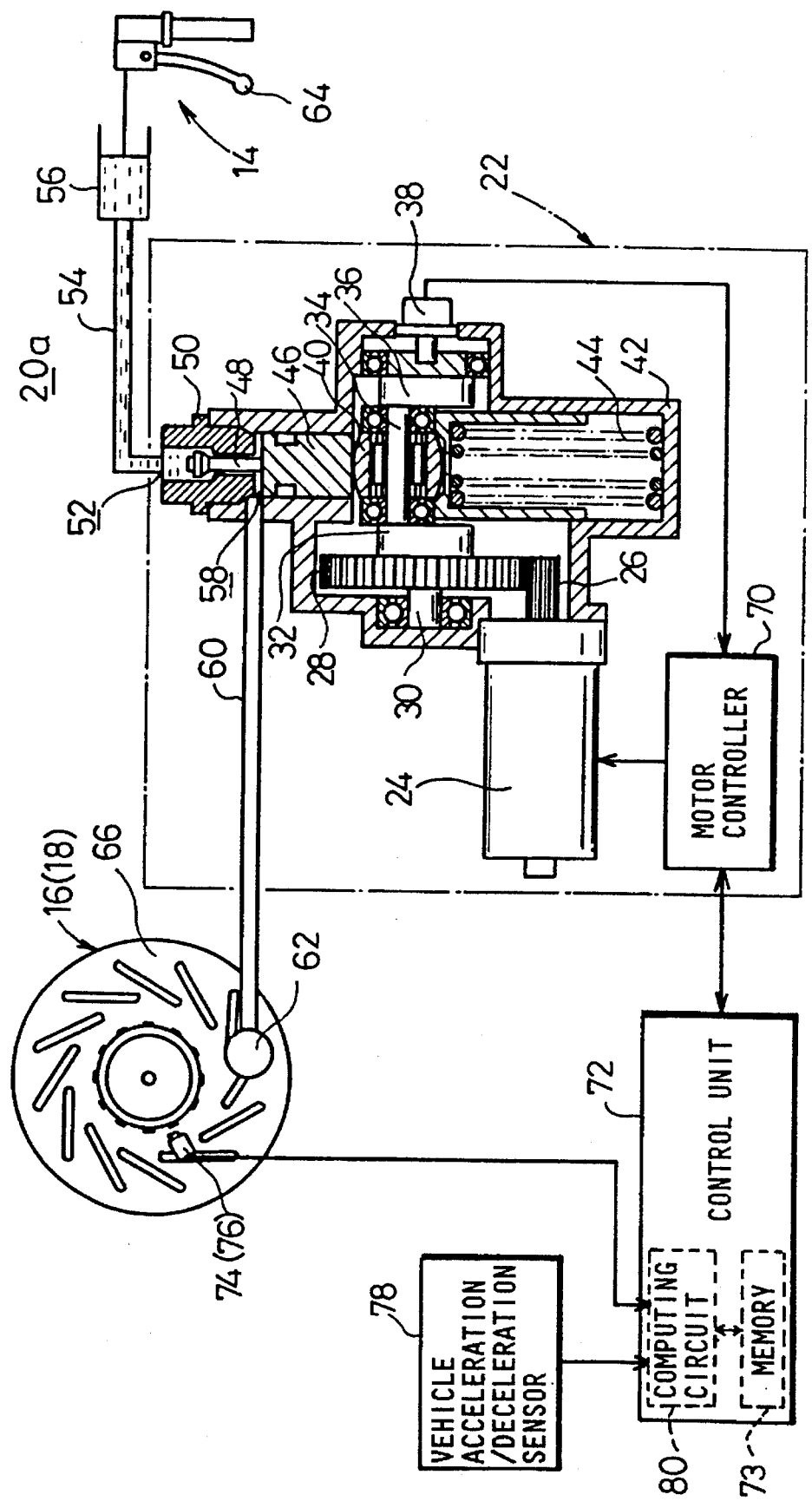
FIG. 18 is a schematic view showing the structure of a brake control system according to another embodiment of the present invention.

More specifically, the brake control system 20a according to the present embodiment has a control unit 72 provided with a computing circuit 80 as well as a memory 73 as shown in FIG. 18. A table in which a wheel slip ratio λ and a wheel acceleration/deceleration α are defined as inputs and the amount of increase or decrease in hydraulic pressure at a caliper cylinder 62 is defined as an output, is stored as data in the memory 73 (see FIGS. 19(A) and 19(B)). Further, a wheel speed sensor 74 (76) attached to a disk plate 66, and a vehicle acceleration/deceleration sensor 78 are electrically connected to the computing circuit 80 of the control unit 72, for computing a slip ratio λ and a wheel acceleration/deceleration α.

Incidentally, the table employed in the present embodiment includes the slip ratio λ to which 64 addresses have been assigned and the wheel acceleration/deceleration α to which 256 addresses have been assigned. A space or interval L for setting data about the slip ratio λ or the wheel acceleration/deceleration $α_m$, and the amount of data are respectively set in the following manner.

Figure 20:
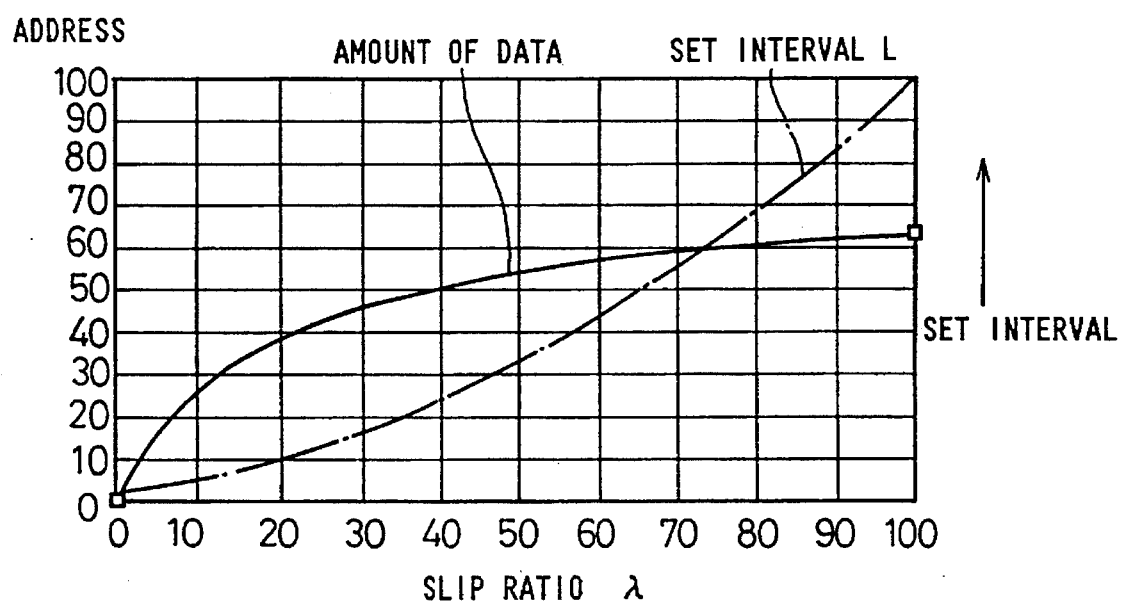
FIG. 20 is a view for describing the relationship between a slip ratio and the number of addresses or an interval for setting the amount of increase or decrease in pressure, all of which are represented in the table employed in the brake control system shown in FIG. 18.
Figure 21:
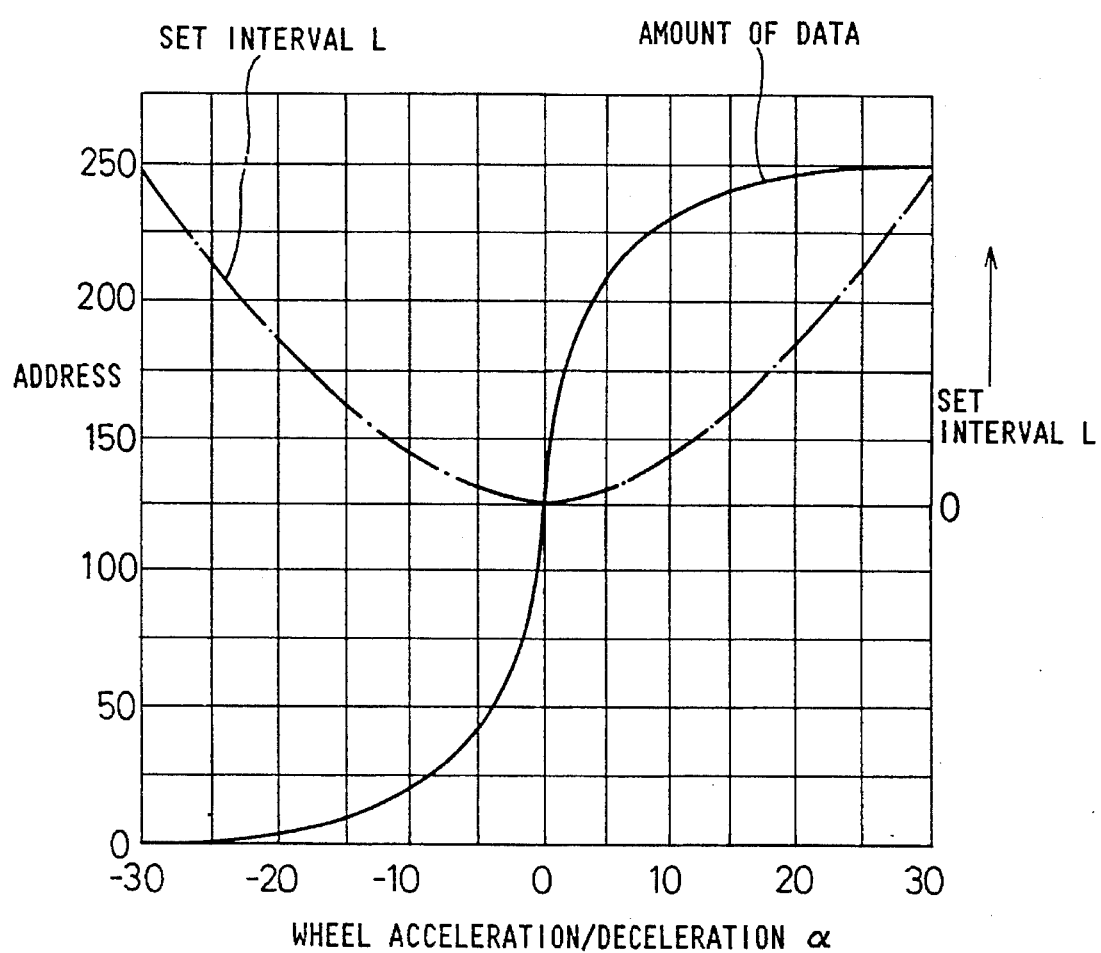
FIG. 21 is a view for describing the relationship between a wheel acceleration/deceleration and the number of addresses or an interval for setting the amount of increase or decrease in pressure, all of which are represented in the table employed in the brake control system shown in FIG. 18.

As shown in FIGS. 20 and 21, an interval L defined between adjacent slip ratio data is set so as to increase as the absolute value of the slip ratio λ is raised from a value approximate to zero. Similarly, an interval L defined between adjacent wheel acceleration/deceleration data is set so as to increase as the absolute value of the wheel acceleration/deceleration α is raised from a value approximate to zero. That is, the braking performance and the vehicle running stability are excellent as viewed from a relationship between the slip ratio λ and the friction coefficient of the road surface. In addition, a number of memory areas are used in such a manner that high-resolution data are concentrated on a range of 0% to 10% of the slip ratio (λ) in which a convergent target slip ratio λT, which serves as a control target, is set and on a wheel acceleration/deceleration (α) range up to +1.0G, which is set from the standpoint of the braking performance and the vehicle running stability. When, on the other hand, the absolute value of each of the slip ratio λ and the wheel acceleration/deceleration α is large, low resolution data is enough and memory areas to be used are set so as to be reduced in number.

The operation of the brake control system 20a constructed as described above is identical to that of the brake control system according to the second embodiment.

Figure 22A:
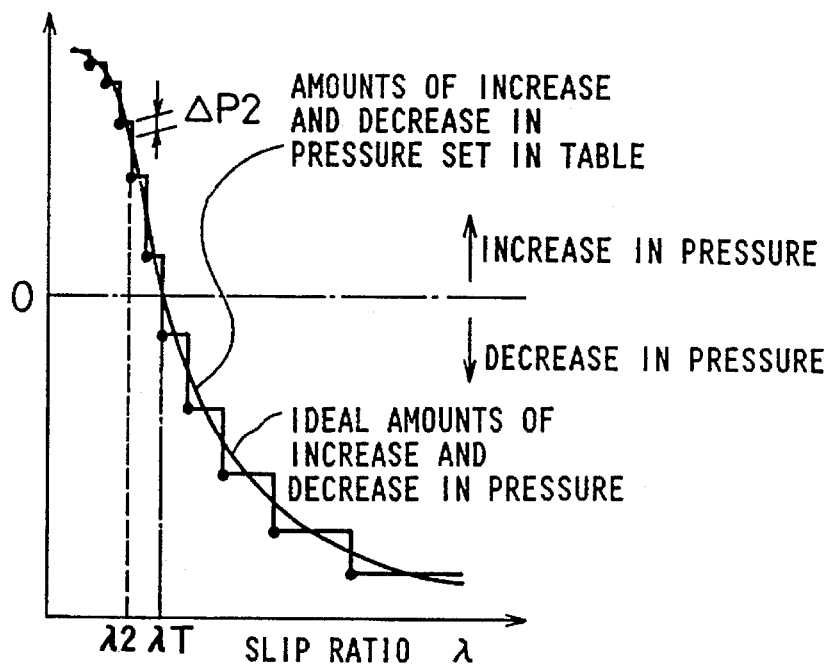
FIG. 22a is a view for describing the relationship between a slip ratio and the amount of increase and/or decrease in caliper pressure, which are shown in the table employed in the brake control system shown in FIG. 18.
Figure 22B:
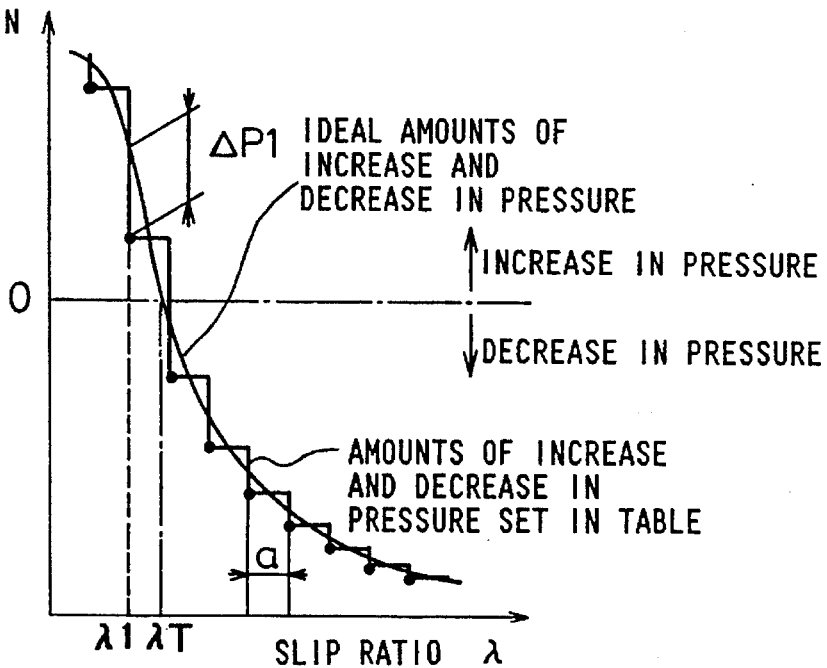

In the table, the data about the amounts of increase and decrease in the caliper pressure are set so as to be concentrated on the 0% to 10% range of the slip ratio λ, which serves as the control target and on the wheel acceleration/deceleration (α) range up to ±1.0G as shown in FIGS. 19(A) through 21. When the amounts of increase and decrease in brake pressure with respect to the slip ratio λ are set at equal intervals a in the table as shown in FIG. 22b by way of example, a control error ΔP1 developed between the ideal amounts of increase and decrease in the brake pressure and the amounts of increase and decrease in the brake pressure, which have been set in the table, is large when the slip ratio is $λ_1$, for example. Even if the slip ratio is $λ_2$ is adjacent to a convergent target slip ratio λT on the other hand, a control error ΔP2 developed between the ideal amounts of increase and decrease in caliper pressure and the amounts of increase and decrease in the caliper pressure, which have been set in the table, is small, thereby enabling accurate control.

Further, since large quantities of data (high-resolution data) are set in the vicinity of a convergent target value, the width of amplitude of vibration in the caliper pressure is also reduced quickly and the slip ratio λ promptly converges on the target value. When, on the other hand, the absolute value of the slip ratio λ or the wheel acceleration/deceleration α falls within a large range, it is only necessary to set small quantities of data (low-resolution Therefore, the storage capacity of the entire memory can be reduced.

In the present embodiment as described above, when the amounts of increase and decrease in the caliper pressure are determined from the slip ratio λ and the wheel acceleration/deceleration α, the data about the amounts of increase and decrease in the caliper pressure are set in the table so as to be converged in the vicinity of the target slip ratio representative of the convergent target or within the wheel acceleration/deceleration α of ±1.0G. Therefore, any variation in the caliper pressure with respect to the target value is promptly reduced, so that the slip ratio λ converges on the target value. When the absolute value of the slip ratio λ or the wheel acceleration/deceleration α falls within the large range, the small quantities of data are set and the memory areas to be used are reduced. Therefore, the storage capacity of the entire memory can be reduced.

Next, a method of and a system for controlling the rate of increase in brake pressure, which will be illustrated as a fourth embodiment, will hereinafter be described in detail with reference to the accompanying drawings. A motorcycle described in the fourth embodiment and the brake control system are identical in structure to those according to the second embodiment, and their detailed description will therefore be omitted (see FIGS. 8 and 9).

The operation of a brake control system 20b will now be described below in connection with the brake control method according to the present embodiment.

Upon normal braking, a crank pin 34 is maintained at a predetermined upper limit position by resilient forces of return springs 44 so as to cause a cam bearing 40 mounted on the crank pin 34 to hold an expander piston 46 in a forced-up state. Thus, a cut valve 48 is forced up by the expander piston 46 to thereby enable an input port 52 to communicate with an output port 58.

A master cylinder 56 is then actuated by gripping a brake lever 64. Brake hydraulic pressure generated by the master cylinder 56 is transmitted to a caliper cylinder 62 through a passage 54, the input port 52, the output port 58 and a passage 60 in that order, thereby applying a force to a disk plate 66 as a caliper force.

In order to perform antilock braking, a control unit 72 then supplies a drive signal to a motor controller 70 so as to control the direction and amount of rotation of a d.c. motor 24. Therefore, a pinion 26 mounted on an unillustrated rotatable shaft is rotated to turn both a gear 28 held in meshing engagement with the pinion 26 and a crank arm 32, thereby displacing the crank pin 34 mounted to the crank arm 32 from the upper limit position to the lower limit position. Thus, the cam bearing 40 is lowered under the displacement action of the crank pin 34, so that the expander piston 46 and the cut valve 48 are lowered in the form of a single unit. When the cut valve 48 is then seated, the input port 52 is cut off from communicating with the output port 58. Thereafter, the expander piston 46 is further lowered singly. Consequently, the volume in the output port 58 side increases so as to decrease the hydraulic pressure which is applied to the caliper cylinder 62, thereby reducing a braking force which is applied to a front wheel 16, for example. Thus, the antilock braking is effected.

Figure 23:
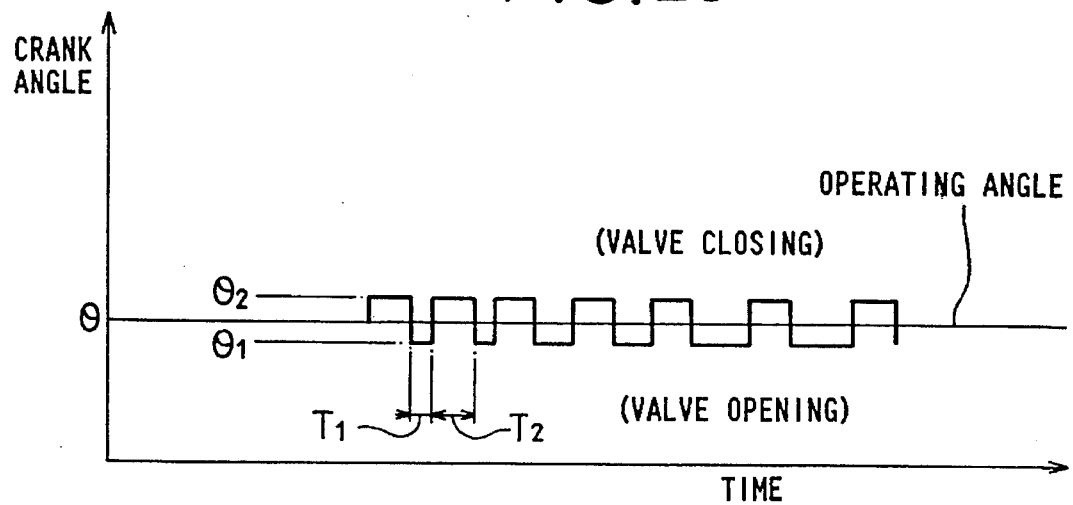
FIG. 23 is a view for describing a method of controlling brakes, according to the present invention.
Figure 24:
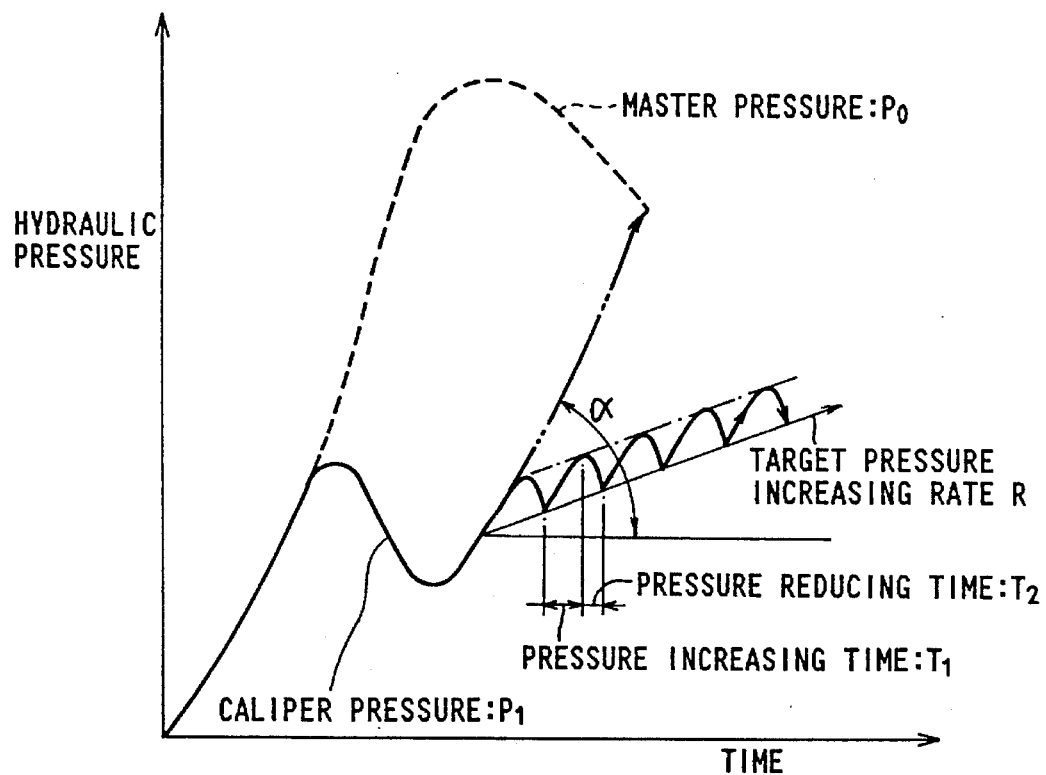
FIG. 24 is a view for describing the comparison between a caliper pressure increasing rate employed in the prior art and that employed in the present invention.

In the present embodiment, the caliper pressure increasing rate can be arbitrarily adjusted within an angular range α shown in FIG. 24 when the braking is changed from the antilock braking to the normal braking. That is, as shown in FIG. 23, the crank angle of the crank pin 34 is repeatedly changed to an angle of $θ_1$ and an angle of $θ_2$ at their corresponding given time intervals of $T_1$ and $T_2$ about an operating angle θ (seating angle) (where θ is greater than $θ_1$ and less than $θ_2$, i.e., $θ_1<θ<θ_2$) of the cut valve 48. Now, the angle $θ_1$ is made or set to open the cut valve 48 so as to increase caliper pressure $P_1$. The angle $θ_2$ is defined to close the cut valve 48 and further lower the expander piston 46 to thereby reduce the caliper pressure $P_1$. Thus, the caliper pressure $P_1$ is substantially increased along an arbitrary target pressure increasing rate R while a pressure increase and decrease is being repeated.

The angles $θ_1$ and $θ_2$ are detected by the potentiometer 38 attached to the other end of the crank pin 34 via the crank arm 36. The detected signal is transmitted to the motor controller 70, which in turn drives and controls the d.c. motor 24, thereby accurately holding the crank pin 34.

In the present embodiment as described above, the substantial target increasing rate R of the caliper pressure $P_1$ is arbitrarily set within the angular range α by selecting the time intervals $T_1$, $T_2$ required to hold the crank pin 34 based on the their corresponding angles $θ_1$, $θ_2$. Thus, when the braking is changed from the antilock braking to the normal braking as in the prior art, an abrupt increase (a so-called breakthrough) in the caliper pressure $P_1$ is not developed and any vehicle behavior can be reduced as small as possible, thereby making it possible to improve the control feeling.

Further, a modulator 22 is of a simple structure. Hence, the modulator 22 can be greatly simplified in structure and made inexpensive as compared with a conventional double structure type modulator.

Finally, a method of controlling the rate of increase in caliper pressure, which is to be illustrated as a fifth embodiment, will hereinafter be described in detail with reference to the accompanying drawings. A motorcycle and a brake control system described in the present embodiment are substantially identical in structure to those according to the fourth embodiment, and their detailed description will therefore be omitted.

Figure 25:
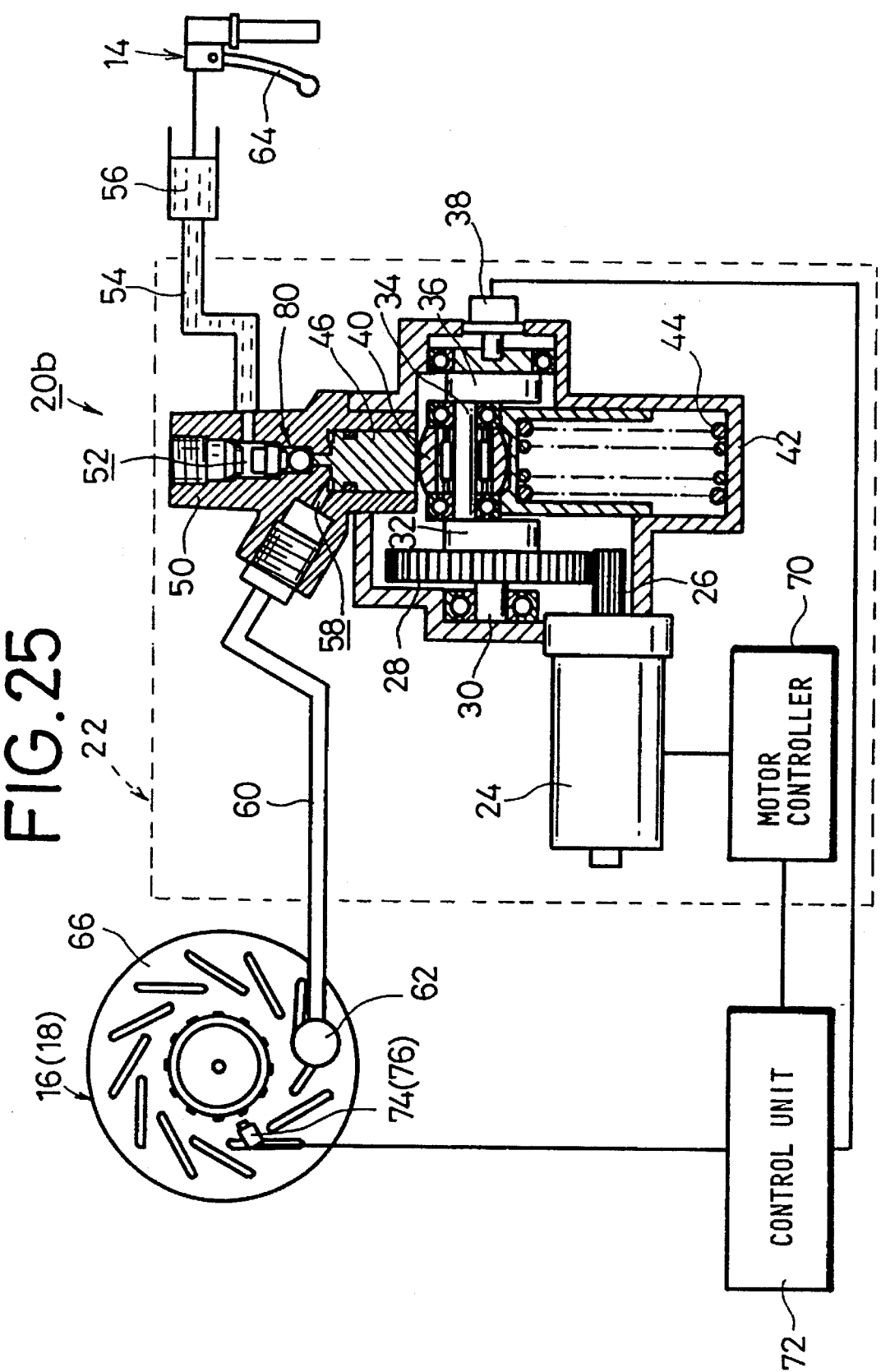
FIG. 25 is a schematic view illustrating the overall structure of a brake control system according to a further embodiment of the present invention, for performing a brake control method according to the present invention.
Figure 26:
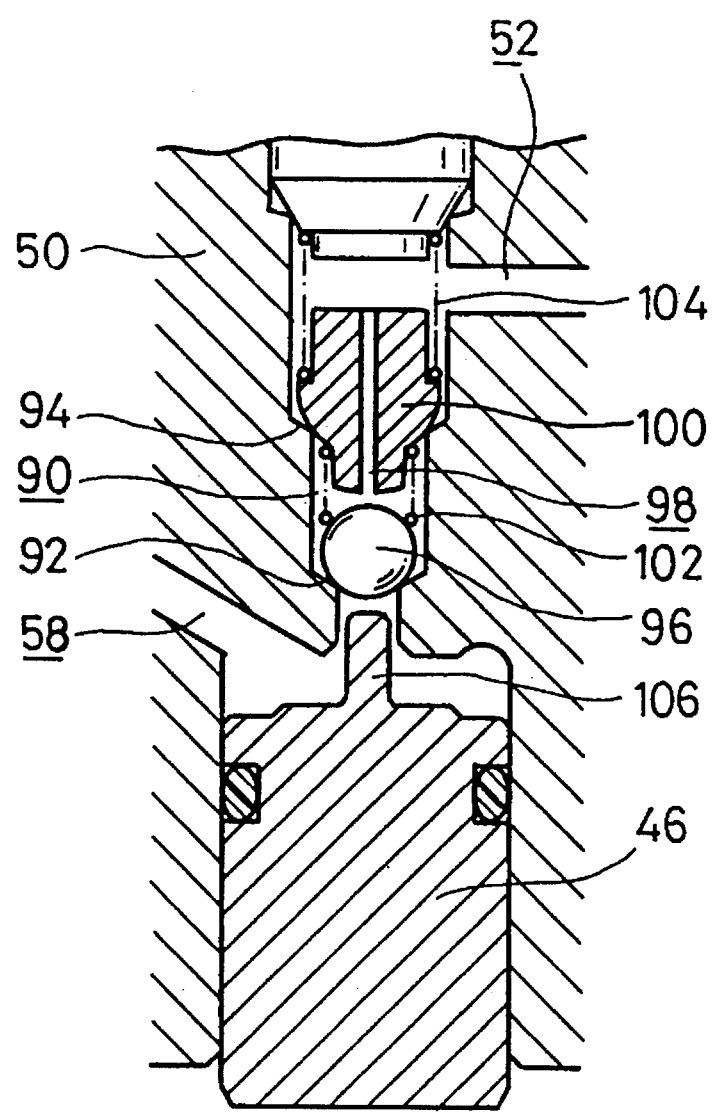
FIG. 26 is a view for describing the manner of operation of a cut valve mechanism employed in the brake control system shown in FIG. 25.
Figure 27:
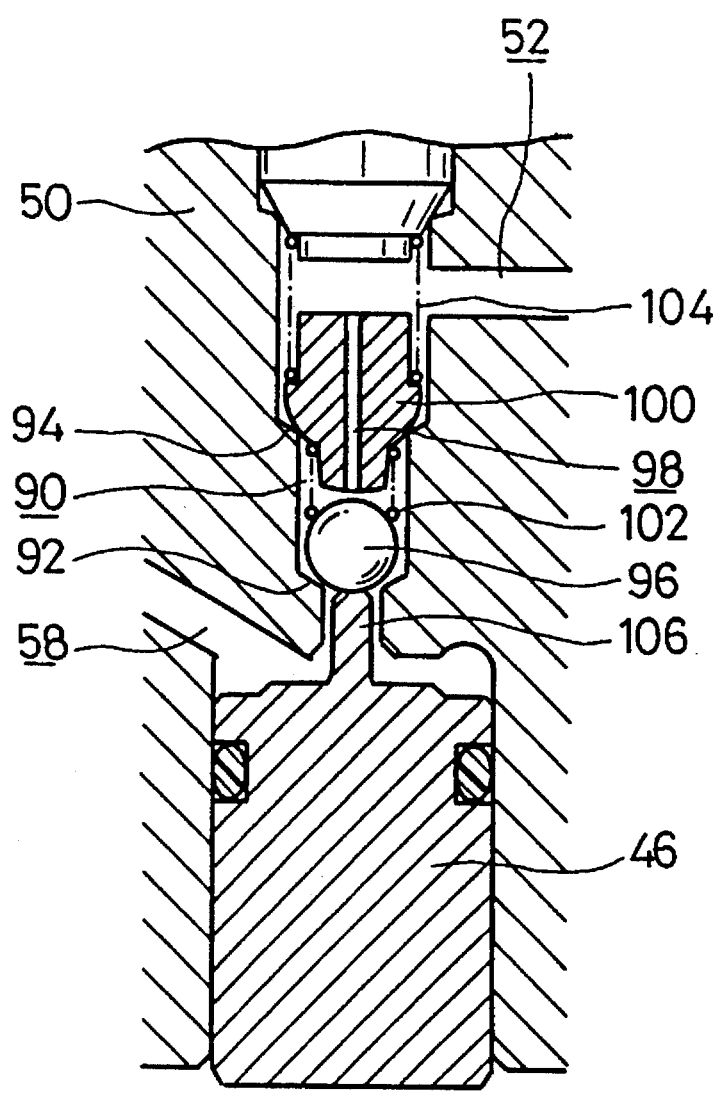
FIG. 27 is a view for describing the manner of another operation of the cut valve mechanism employed in the brake control system depicted in FIG. 25.
Figure 28:
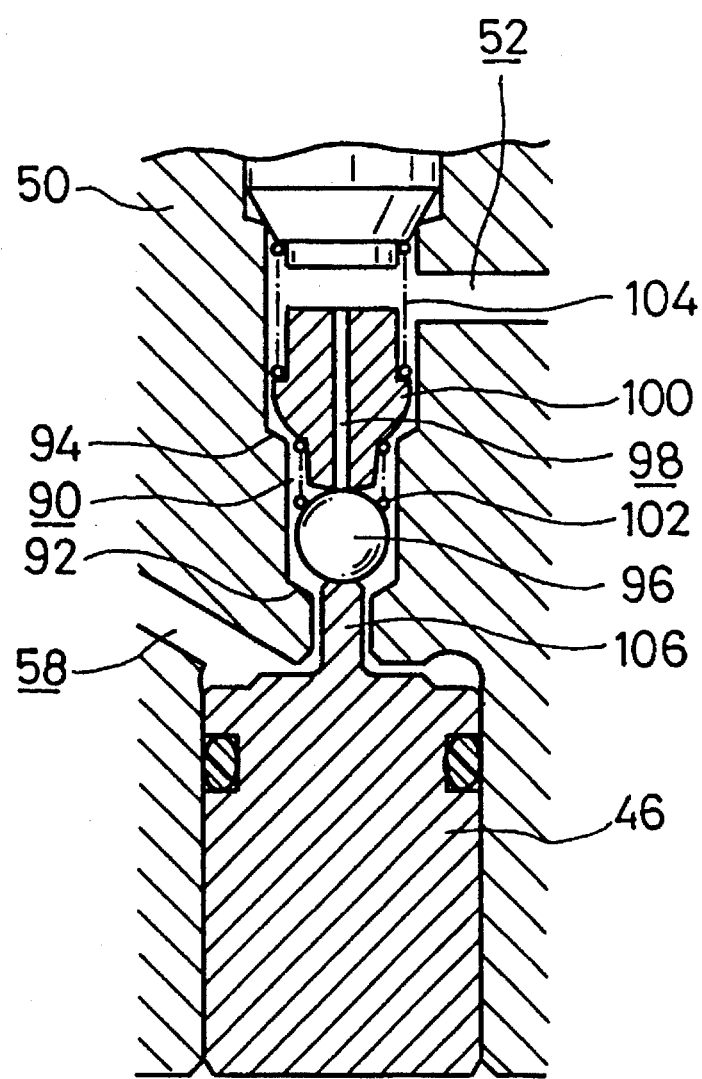
FIG. 28 is a view for describing the manner of a further operation of the cut valve mechanism employed in the brake control system shown in FIG. 25.

However, the brake control system 20b is provided with a Cut valve mechanism 80 corresponding to the cut valve 48 employed in the fourth embodiment as shown in FIG. 25. As shown in FIGS. 26 through 28, the cut valve mechanism 80 has a cylindrical communication hole 90 which is defined in a cut valve holder 50 and whose diameter is reduced in the form of two steps toward the output port 58 as seen from the input port 52. Portions of the communication hole 90, which have been reduced in diameter in the form of the two steps, are used as seat portions 94, 92 respectively. A spheric cut valve 96 and an orifice valve 100 having an orifice 98 defined therein are inserted into the communication hole 90. The cut valve 96 is coupled to the orifice valve 100 via a coil spring 102 and pressed downward by a resilient force of the coil spring 102 so as to be held in abutment against the seat portion 92. The orifice valve 100 is brought into engagement with the upper surface of the input port 52 by a coil spring 104 and pressed downward by a resilient force of the coil spring 104 so as to be seated on the seat portion 94. A convex leading end 106 of the expander piston 46 is brought into abutment against the cut valve 96 so as to displace the cut valve 96 in a desired direction. Incidentally, the resilient force of the coil spring 104 is set so as to be larger than that of the coil spring 102.

Thus, the d.c. motor 24 is energized to displace the crank pin 34 so as to move the expander piston 46 in upward and downward directions, thereby controlling the cut valve mechanism 80 so as to be brought into the following three basic states or conditions. More specifically, as shown in FIG. 26, the expander piston 46 is lowered to separate the leading end 106 of the expander piston 46 from the cut valve 96 so as to seat the cut valve 96 on the seat portion 92, thereby bringing the communication between the input port 52 and the output port 58 into a cut-off state or condition (hereinafter called an "ABS condition"). As shown in FIG. 27, the expander piston 46 is displaced upward from the ABS condition so as to abut against the cut valve 96, thereby spacing the cut valve 96 away from the seat portion 92. At this time, however, the cut valve 96 does not abut against the orifice valve 100 and the input port 52 and the output port 58 are brought into a communication condition (hereinafter called an "ORIFICE condition") by the orifice 98 in a state in which the orifice valve 100 has been seated on the seat portion 94. As illustrated in FIG. 28, the expander piston 46 is further displaced upward from the ORIFICE condition to bring the cut valve 96 into abutment against the orifice valve 100 so as to separate the orifice valve 100 from the seat portion 94, thereby bringing the input port 52 and the output port 58 into a communication state (hereinafter called a "NORMAL condition"). Under the ORIFICE condition, the coil spring 102 is compressed by separating the cut valve 96 from the seat portion 92, so that the orifice valve 100 is upwardly urged by the resilient force of the coil spring 102. Since, however, the resilient force of the coil spring 104 for urging the orifice valve 100 in a downward direction is set so as to be larger than that of the coil spring 102, the orifice valve 100 is not separated from the seat portion 94.

Accordingly, the three conditions can be changed over by effecting positional control using the d.c. motor 24, i.e., controlling the position of the expander piston 46 without regard to the difference in hydraulic pressure between the input port 52 and the output port 58.

The operation of the brake control system 20b constructed as described above will now be described below in connection with the brake control method according to the present embodiment.

Upon normal braking, the crank pin 34 is maintained at the predetermined upper limit position by the resilient forces of the return springs 44 so as to cause the cam bearing 40 mounted on the crank pin 34 to hold the expander piston 46 in the forced-up state. Thus, the cut valve 96 is forced up by the expander piston 46 so as to cause the input port 52 to communicate with the output port 58 (see FIG. 28).

When the brake lever 64 is then gripped, the master cylinder 56 is actuated. Brake hydraulic pressure generated by the master cylinder 56 is then transmitted to the caliper cylinder 62 through the passage 54, the input port 52, the output port 58 and the passage 60 in that order, thereby applying a caliper force to the disk plate 66 by caliper pressure $P_c$.

Figure 29:
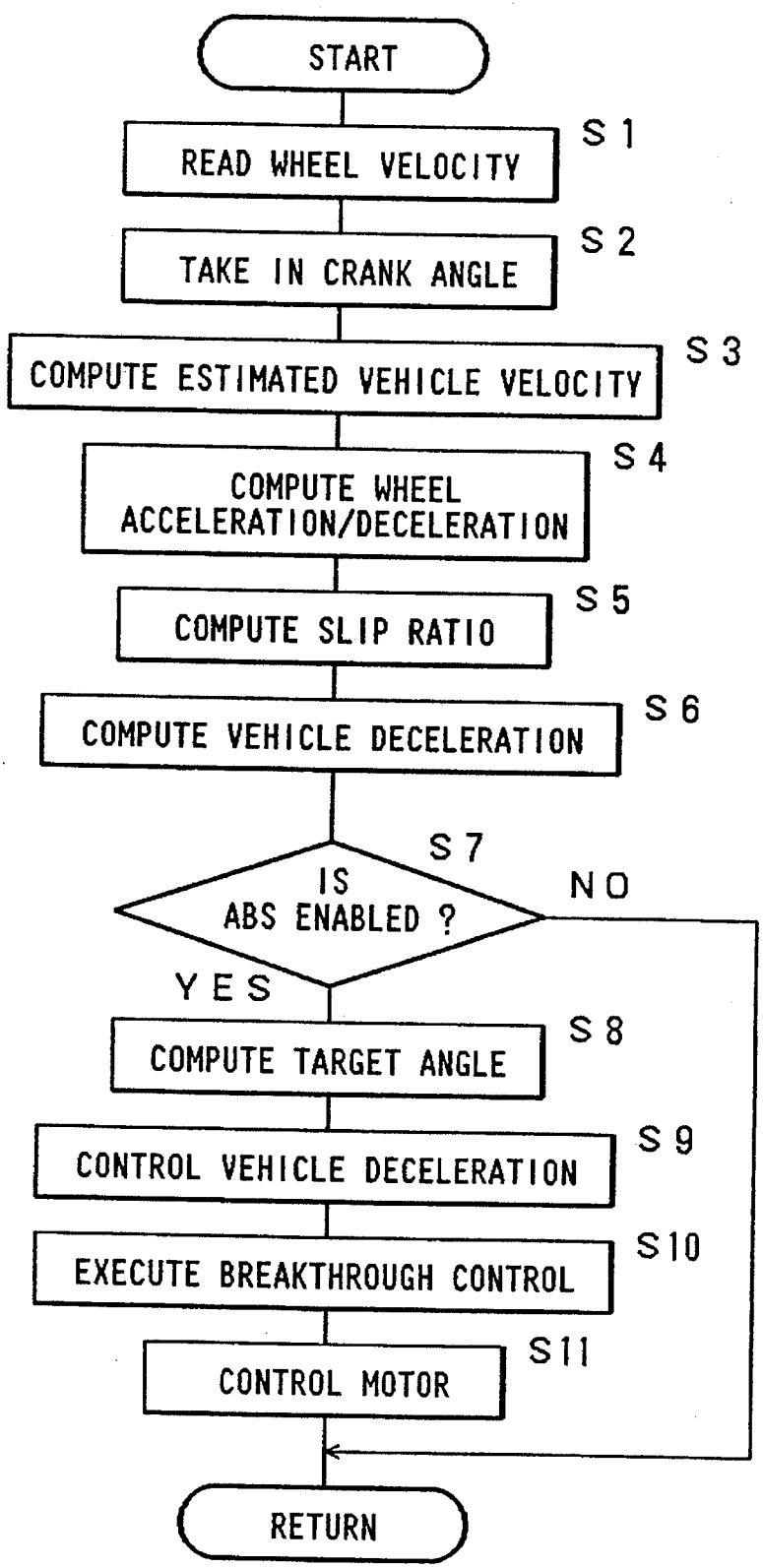
FIG. 29 is a flowchart for describing an overall control routine which is executed in the brake control method according to the present invention.

On the other hand, the brake control system 20b is controlled based on a flowchart shown in FIG. 29 upon antilock control. That is, the control unit 72 reads the velocities $V_W$ of front and rear wheels based on signals outputted from wheel speed sensors 74, 76 and reads a displacement angle (hereinafter called a "crank angle") of the crank pin 34 based on a signal outputted from the potentiometer 38 (Steps S1 and S2). The fastest one of the velocities $V_W$ of the front and rear wheels is regarded as an estimated vehicle velocity $V_r$. The estimated vehicle velocity $V_r$ is determined by effecting so-called high selection (Step S3). The wheel velocity $V_W$ is then differentiated to determine a wheel acceleration/deceleration α (Step S4). A slip ratio λ is determined based on the estimated vehicle velocity $V_r$ and the wheel velocity $V_W$ (Step S5). Further, a vehicle deceleration β is determined from the estimated vehicle velocity $V_r$ (Step S6). A determination (enable judgment or determination) is made as to whether or not it is necessary to effect antilock (ABS) control based on both the wheel acceleration/deceleration α and the slip ratio λ thus determined (Step S7). If the answer is determined to be Yes in Step S7, then the amounts of increase and decrease in the caliper pressure $P_c$ are determined from the wheel acceleration/deceleration α and the slip ratio λ using a table or the like, and a target crank angle θT is set (Step S8). Then, the target crank angle θT is corrected based on the vehicle deceleration β (Step S9). Now, a determination is made as to the condition of control on the basis of the vehicle deceleration β, the crank angle θ and the target crank angle θT or the like. The target crank angle θT is reset under breakthrough control only when it is determined based on the target crank angle θT that the above control is necessary (Step S10). Thereafter, the d.c. motor 24 is controlled so that the crank angle is brought to the target crank angle θT (Step S11). Incidentally, the breakthrough control is effected to increase the caliper pressure at a given caliper pressure increasing rate in order to prevent a breakthrough described in the conventional example from occurring.

Figure 30:
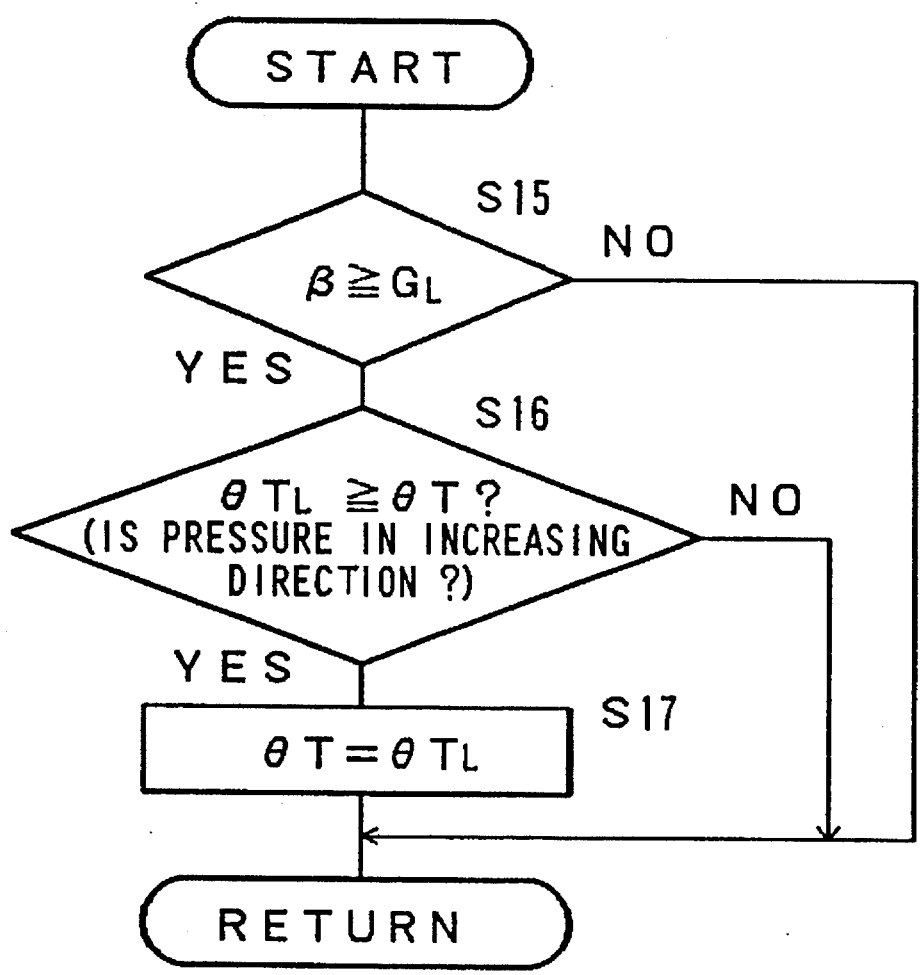
FIG. 30 is a flowchart for describing vehicle deceleration control which is executed in the brake control method according to the present invention.

Incidentally, the vehicle deceleration control in Step S9 is made in the following manner in accordance with a flowchart shown in FIG. 30. It is determined whether or not the vehicle deceleration β is more than or equal to a limit deceleration $G_L$ (Step S15). If the answer is determined to be Yes in Step S15, it is then determined whether or not a target crank angle $θT_L$ of the previous loop is more than or equal to a target crank angle θT of the present loop, i.e., the caliper pressure $P_c$ takes or assumes a pressure increasing direction (Step S16). If the answer is determined to be Yes in Step S16, then the vehicle deceleration β is increased the limit deceleration $G_L$ or more to thereby reset the target crank angle θT of the present loop to the target crank angle $θT_L$ of the previous loop in such a manner that the vehicle stability is not made worse, i.e., the caliper pressure $P_c$ is not increased (Step S17).

Figure 31:
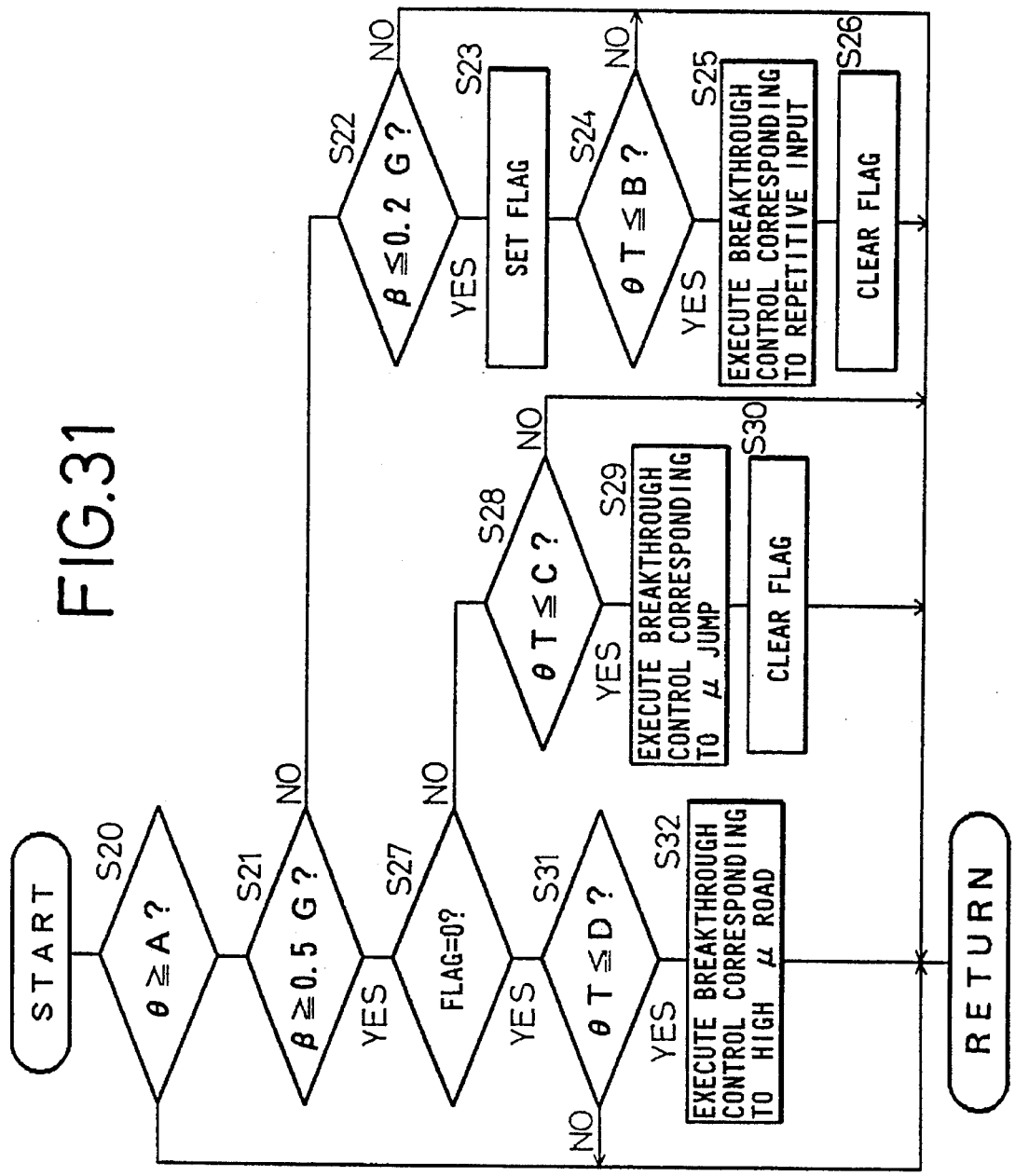
FIG. 31 is a flowchart for describing breakthrough control which is executed in the brake control method according to the present invention.

A detailed description will now be made of the breakthrough control in Step S10 with reference to a flowchart shown in FIG. 31. It is first determined whether or not a crank angle θ detected by the potentiometer 38 is more than or equal to a predetermined angle A (Step S20). The predetermined angle A is defined as a crank angle made when the orifice valve 100 abuts against the cut valve 96 displaced upward by the leading end 106 of the expander piston 46 so as to be spaced away from the seat portion 94. Incidentally, the crank angle is defined in such a manner that the displacement angle of the crank pin 34, which corresponds to the upper limit position of the expander piston 46, is set to 0° and the direction of the lower limit is made positive. That is, the crank angle θ smaller than the given angle A represents that the cut valve mechanism 80 is already in the NORMAL state and hence not regarded as an object to be subjected to the breakthrough control. Accordingly, the following circumstantial judgment is made only when the crank angle θ is more than or equal to the predetermined angle A.

It is first determined whether or not the vehicle deceleration β is more than or equal to 0.5G (Step S21). The vehicle deceleration β is normally more than or equal to 0.5G upon braking under a high μ road such as an asphalt road whose surface is dry or the like. It is therefore determined that the state of the road surface is regarded as the high μ road if the vehicle deceleration β is more than or equal to 0.5G.

If the vehicle deceleration β is less than 0.5G, it is then determined whether or not the vehicle deceleration β is less than or equal to 0.2G (Step S22). The vehicle deceleration β is normally less than or equal to 0.2G upon braking under a road surface (hereinafter called a "low λ road") of a low friction coefficient, such as an asphalt's road surface which is wet or the like, or in a state (which will be called a "repetitive input") in which a brake input is repeated during a short period of time. It is therefore determined that either the low μ road or the repetitive input has been taken or selected if the vehicle deceleration β is less than or equal to 0.2G.

If it is determined that the vehicle deceleration β is less than or equal to 0.2G, then a flag is set (Step S23). It is then determined whether or not the target crank angle θT is less than or equal to a given angle B (Step S24). That is, the amount of decrease in the caliper pressure $P_c$ increases in the case of the low μ road. Therefore, the target crank angle θT is large. In the case of the repetitive input, the target crank angle θT is small as compared with the low μ road. Thus, the given angle B is set as a threshold value for each of the low μ road and the repetitive input.

When the target crank angle θT is less than or equal to the given angle B, it is determined that the repetitive input is made. A breakthrough process corresponding to the repetitive input, which will be described later, is then executed (Step S25). Further, the flag is cleared (Step S26).

If, on the other hand, it is determined that the vehicle deceleration β is more than or equal to 0.5G, i.e., the high μ road has been taken, it is then judged whether or not the flag is up (set) (Step S27). If the answer is determined to be Yes in Step S27, it is then determined in Steps S22 and S24 that the low μ road has been taken in the previous loop. It is thus determined that the high μ road has been taken in the present loop. That is, it is judged that each wheel has been changed over from the low μ road to the high μ road (hereinafter called a "μ jump"). It is thereafter determined whether or not the target crank angle θT is less than or equal to a predetermined angle C (Step S28). Now, the predetermined angle C represents an angle at which a breakthrough occurs when the target crank angle θT is set to the predetermined angle C or below.

When the target crank angle θT is less than or equal to the predetermined angle C, a breakthrough process corresponding to the μ jump, which will be described later, is effected (Step S29). Further, the flag is cleared (Step S30).

If the flag is down (reset) in Step S27, it is then determined that the high μ road has been selected. It is thereafter determined whether or not the target crank angle θT is less than or equal to a predetermined angle D (Step S31). Now, the predetermined angle D represents an angle at which a breakthrough is made when the target crank angle θT is set to the predetermined angle D or below.

When the target crank angle θT is less than or equal to the predetermined angle D, a breakthrough process corresponding to the high μ road, which will be described later, is carried out (Step S32).

The states of the high μ road, the μ jump and the repetitive input are detected in the above-described manner. The breakthrough control corresponding to each of the high μ road, the μ jump and the repetitive input is effected in the following manner.

A description will first be made of the breakthrough control corresponding to the high μ road on the basis of the result of control shown in FIG. 32. More specifically, when each brake is operated by a rider, the brake pressure is transmitted to the caliper cylinder 62 from the master cylinder 56 via the cut valve mechanism 80 which is in the NORMAL state. Accordingly, the caliper pressure $P_c$ is caused to follow up an increase in the pressure (hereinafter called "master pressure $P_m$") of the master cylinder 56. Thus, when the braking of each wheel is made, the wheel velocity $V_W$ is separated from the estimated vehicle velocity $V_r$ so as to increase the slip ratio $\lambda$, thereby effecting the antilock braking. That is, the cut valve mechanism 80 is brought to the ABS condition. Thereafter, the d.c. motor 24 is energized under the control of the motor controller 70 to displace the crank pin 34 so as to be brought to the target crank angle θT, thereby moving the expander piston 46 upward and downward so that the volume of the output port 58 increases or decreases. As a result, the caliper pressure $P_c$ can be controlled so as to reach a predetermined pressure value P1 or less (see ① in FIG. 32). When the braking is changed from the antilock braking to the normal braking by returning the wheel velocity $V_W$ to the velocity adjacent to the estimated vehicle velocity $V_r$, the caliper pressure $P_c$ gradually increases at a rate set between the predetermined pressure value P1 and a limit pressure value P2 (see ③ in FIG. 32) after the caliper pressure $P_c$ has been caused to follow up the master pressure $P_m$ up to the predetermined pressure value P1 (see ② in FIG. 32). The caliper pressure $P_c$, which has reached the limit pressure value P2, is held constant as it is (see ④ in FIG. 32).

Now, the slow increase in the caliper pressure $P_c$ at the rate set in the range from the predetermined pressure value P1 to the limit pressure value P2 is made from the following reason. The vehicle deceleration β is computed based on the difference between an estimated vehicle velocity $V_r$ detected from a computing loop used several times before or several tens times before as seen from the present computing loop and an estimated vehicle velocity $V_r$ detected from the present computing loop in order to eliminate noise components. Therefore, a difference is developed between the vehicle deceleration β and an actual vehicle deceleration. When the pressure increasing rate is high, an increase in the vehicle deceleration cannot be sensed before the caliper pressure $P_c$ exceeds the limit pressure value P2. That is, since the routine procedure for the vehicle deceleration control (Steps S15 through S17) cannot be executed, a rear-wheel ground load is reduced, thereby causing a risk that the running stability of the vehicle is impaired.

A description will now be made of the breakthrough control corresponding to the μ jump on the basis of the result of control shown in FIG. 33. More specifically, when each brake is operated by the rider, the brake pressure is transmitted to the caliper cylinder 62 from the master cylinder 56 via the cut valve mechanism 80 which is in the NORMAL state. Accordingly, the caliper pressure $P_c$ is caused to follow up an increase in the master pressure $P_m$ (see ① in FIG. 33). Since, however, the state of the road surface is brought to the low μ road, the wheel velocity $V_W$ is quickly reduced and the slip ratio λ increases. Therefore, the cut valve mechanism 80 is brought to the ABS condition and the expander piston 46 is lowered to increase the volume of the output port 58, thereby returning the wheel velocity $V_W$ to the velocity adjacent to the estimated vehicle velocity $V_r$. The expander piston 46 is hereafter displaced upward and downward under the ABS condition to vary the volume of the output port 58, thereby controlling the slip ratio λ so as to fall within a predetermined slip ratio (see ② in FIG. 33). When the state of the road surface along which each wheel travels, is changed over from the low μ road to the high μ road, a gripping force of each wheel increases to make the estimated vehicle velocity $V_r$ substantially identical to the wheel velocity $V_W$. Consequently, the slip ratio is reduced to thereby change over the braking from the ABS braking to the normal braking. Accordingly, the caliper pressure $P_c$ increases while following up the master pressure $P_m$. However, when the front wheel is used, the pressure increasing rate is set in such a manner that the time $\Delta_{t1}$ (between $t_3$ and $t_4$) required to change over the braking from the ABS braking to the normal braking falls within a set time range, preferably a range from 0.1s to 0.3s (see ③ in FIG. 33). This setting is made based on the following reason. In the case of the μ jump, a time difference is developed between a transition of the state of the running road surface of the front wheel from the low μ road to the high μ road and a transition of the state of the running road surface of the rear wheel from the low μ road to the high μ road. When the front wheel is placed under the normal braking and the rear wheel is placed under the antilock braking during a period corresponding to the time difference, the difference in the braking forces between the front and rear wheels increases and hence the feeling of control is degraded.

Figure 34:
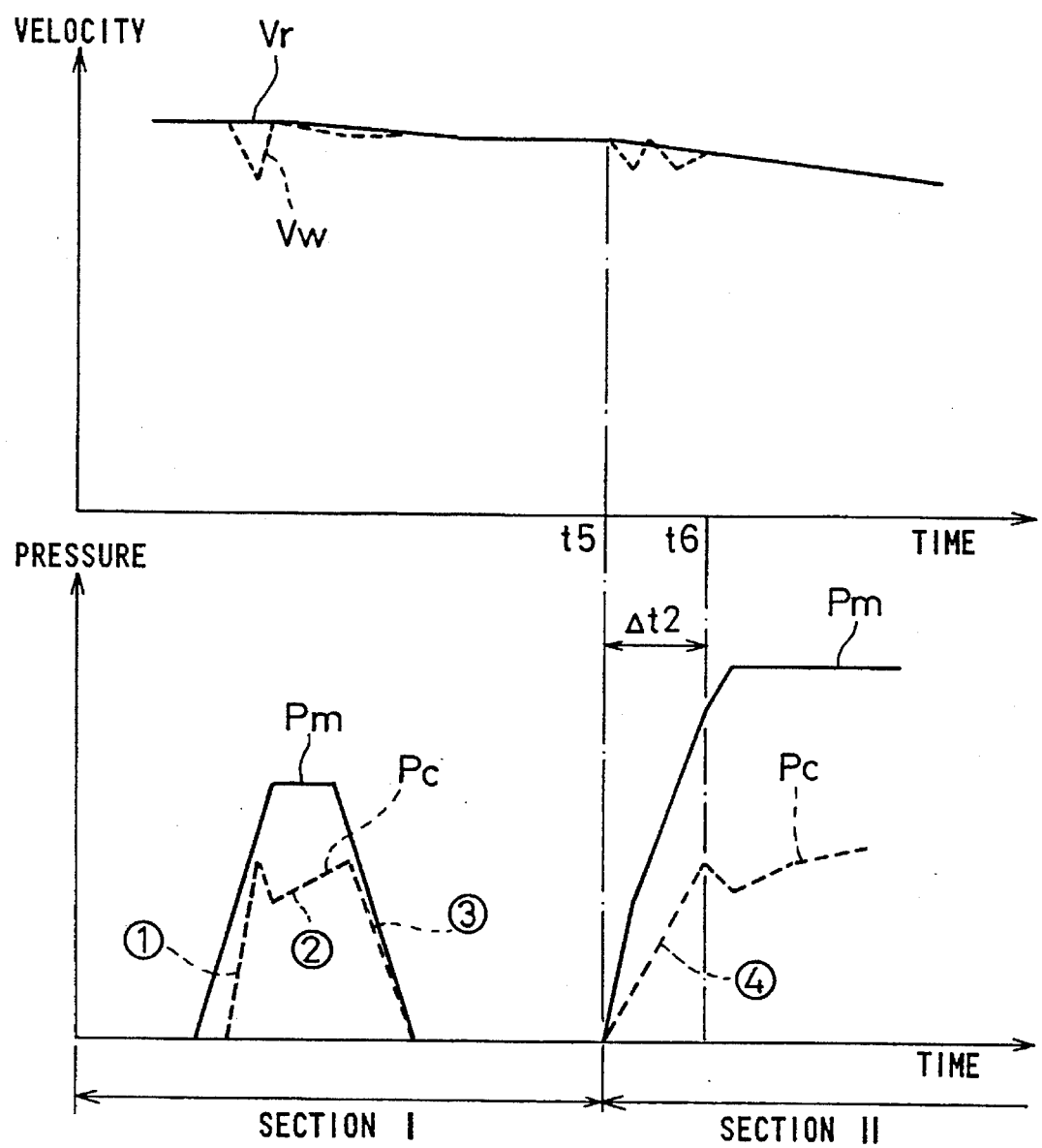
FIG. 34 is a view depicting the result of control on a repetitive input by the brake control method according to the present invention.

A description will be finally made of the breakthrough control corresponding to the repetitive input with reference to FIG. 34. More specifically, when the brake operation is repeated by the rider, the caliper pressure $P_c$ is first increased while following up the master pressure $P_m$ under the normal braking upon the first brake input (see a section I) (see ① in FIG. 34). The slip ratio λ increases with a decrease in the wheel velocity $V_W$ to thereby change the braking from the normal braking to the ABS braking. That is, the caliper pressure $P_c$ is controlled so as to reach predetermined caliper pressure or below (see ② in FIG. 34). Further, the caliper pressure $P_c$ also decreases with a reduction in the brake input, i.e., a reduction in the master pressure $P_m$ (see ③ in FIG. 34).

When the brake input (see a section II) is then made again within a given time interval, it is necessary that the caliper pressure $P_c$ is proportional to the master pressure $P_m$ (brake input). That is, this is because the rider desires to carry out subtle braking by experiencing the sensation of the amount of operation of each brake by the rider from the actual vehicle deceleration β. Accordingly, the caliper pressure increasing rate is set in such a manner that the caliper pressure $P_c$ is raised up to a given pressure value capable of providing the sensation of the actual vehicle deceleration β by the rider during a given time interval $\Delta t_2$ between a brake operation time $t_5$ and a time $t_6$ at the time that a given period has passed since the brake operation time $t_5$ (see ④ in FIG. 34). The time interval $\Delta_{t2}$ is preferably less than or equal to 0.3 ms.

Figure 32:
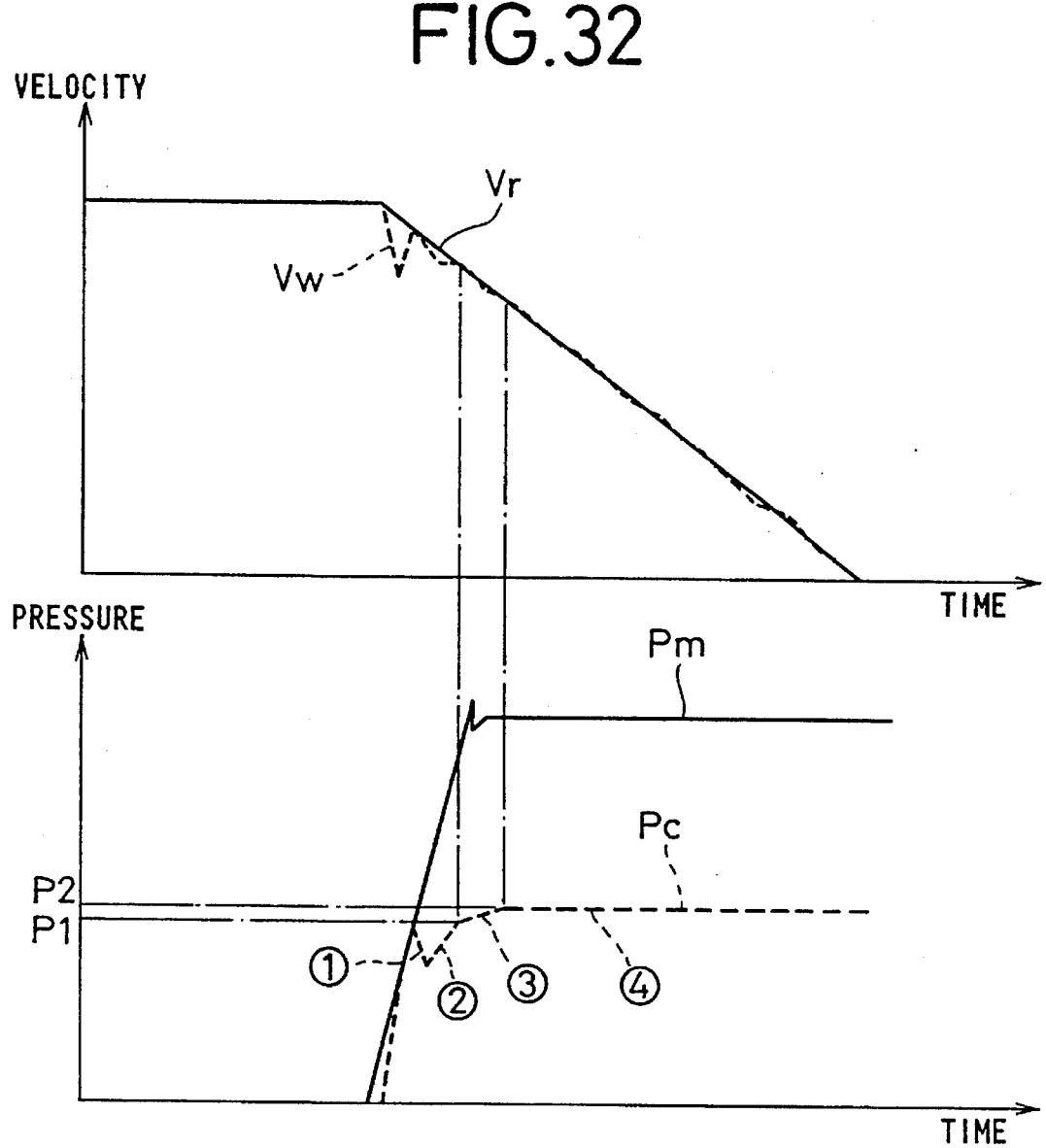
FIG. 32 is a view showing the result of control effected under a high θ road by the brake control method according to the present invention.
Figure 33:
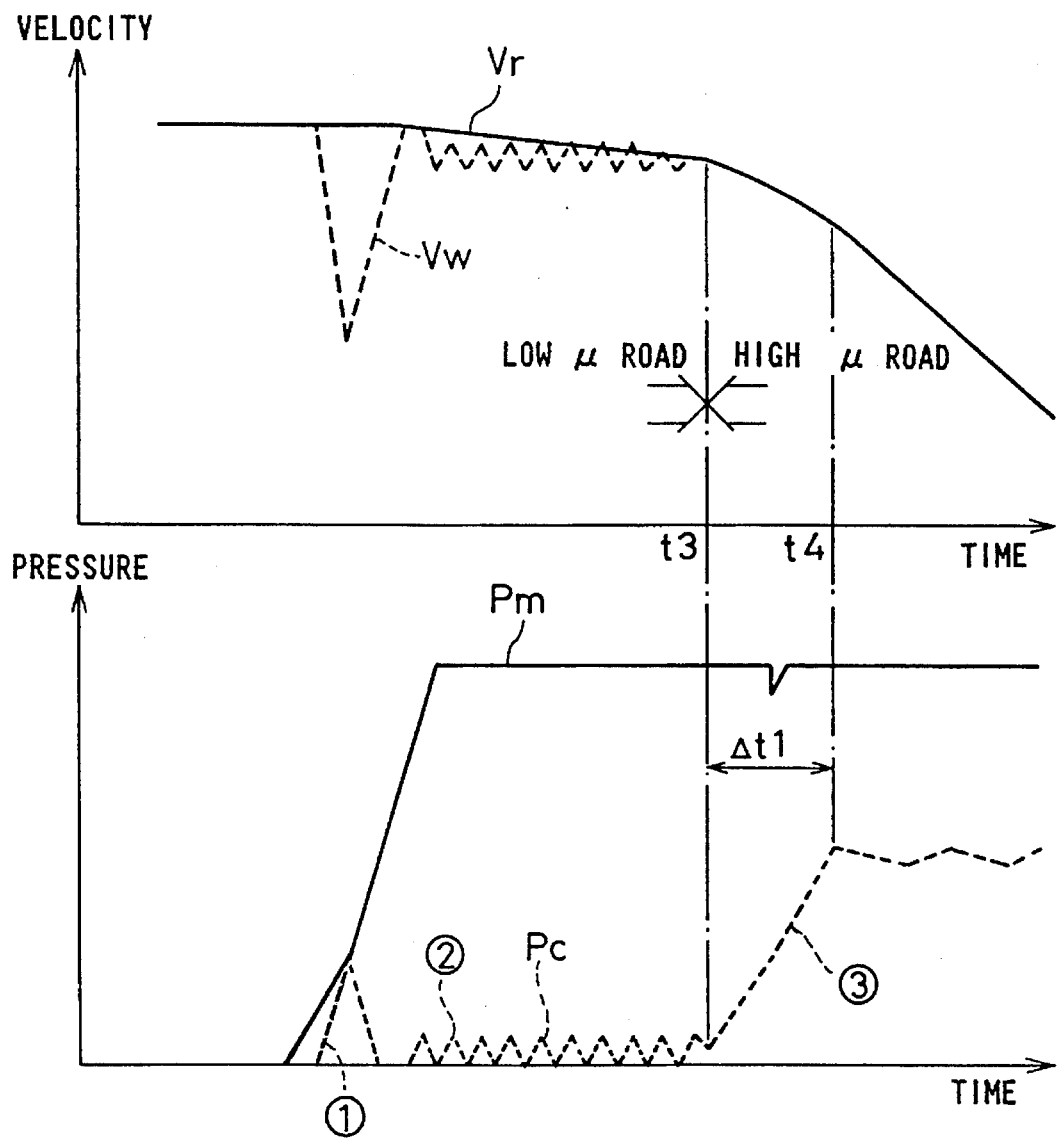
FIG. 33 is a view illustrating the result of control effected under a µ jump by the brake control method according to the present invention.
Figure 35:
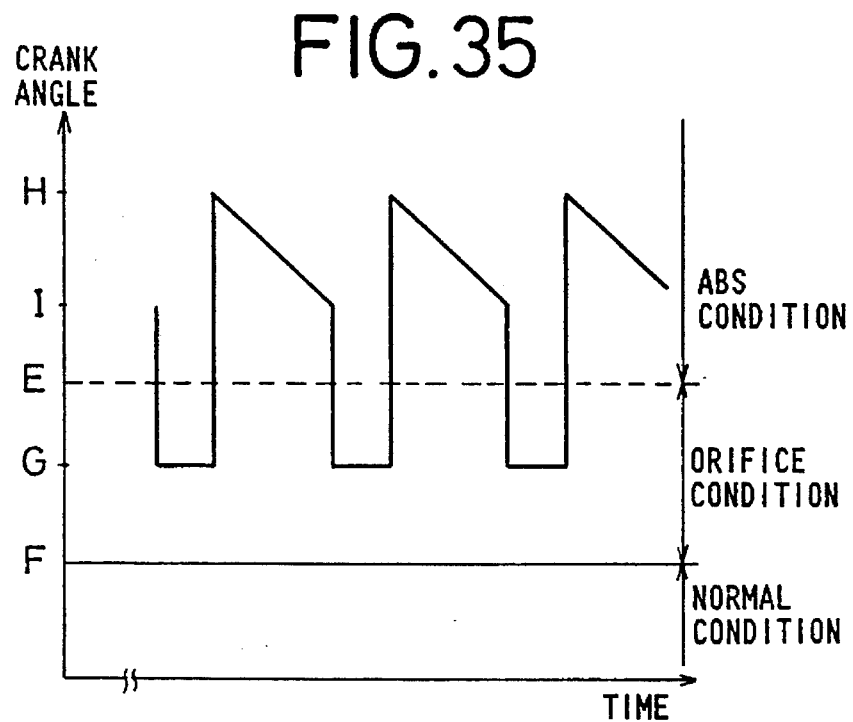
FIG. 35 is a view for describing the setting of a target crank angle by the brake control method according to the present invention.
Figure 36:
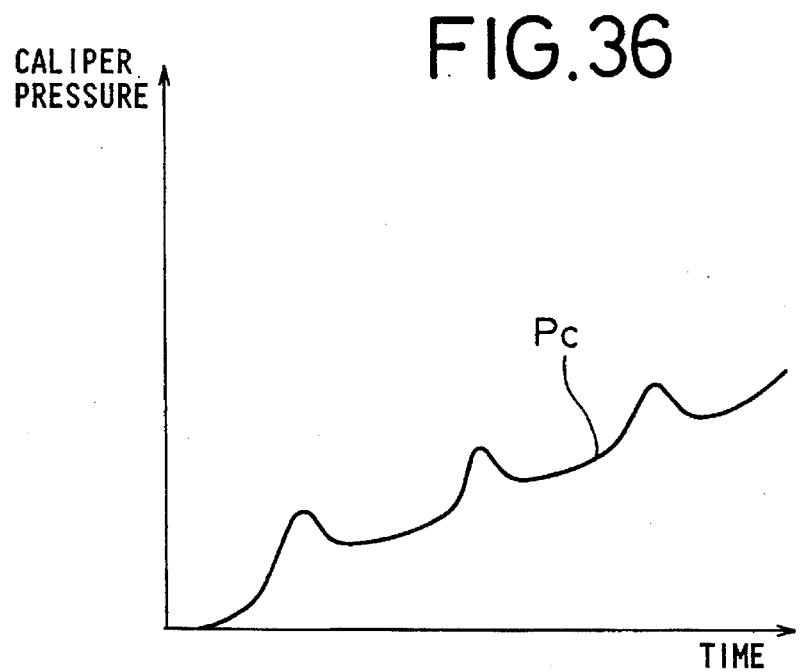
FIG. 36 is a view for describing an increasing rate of caliper pressure which has been controlled by the target crank angle shown in FIG. 35.

Thus, the caliper pressure $P_c$ is increased and controlled according to the set caliper pressure increasing rate (see ③ in FIG. 32, ③ in FIG. 33 and ④ in FIG. 34). As shown in FIG. 35 by way of example, the target crank angle θT is set to each of a crank angle G for bringing the cut valve mechanism 80 to the ORIFICE condition and crank angles H, I for bringing the cut valve mechanism 80 to the ABS condition, so as to be associated with a crank angle E at which the leading end 106 of the expander piston 46 abuts against the cut valve 96 and a crank angle F at which the cut valve 96 abuts against the orifice valve 100. Based on the crank angles G, H, I, the motor controller 70 is activated to energize the d.c. motor 24. Accordingly, the crank pin 34 is displaced based on the target crank angle θT to move the expander piston 46 in the upward and downward directions so as to repeatedly seat and separate the cut valve 96 on and from the seat portion 92. Thus, when the cut valve mechanism 80 is in the ORIFICE condition, it is activated to transmit the master pressure $P_m$ from the input port 52 to the output port 58 via the orifice 98, thereby increasing the caliper pressure $P_c$ at the caliper pressure increasing rate shown in FIG. 36. This caliper pressure increasing rate can be set to a desired caliper pressure increasing rate by suitably changing a target pattern.

In the present embodiment as described above, the condition of a road surface is estimated from a vehicle deceleration $\beta$. The state of a brake operation is detected based on a crank angle $\theta$ and a target crank angle $\theta T$. The increasing rate of caliper pressure $P_c$ at the time that the braking is changed from the antilock braking to the normal braking, is set according to the conditions of both the road surface and the brake operation. A target crank angle $\theta T$ corresponding to each of ORIFICE and ABS conditions is set based on a given pattern so as to meet the caliper pressure increasing rate. A d.c. motor 24 is then energized based on the target crank angle $\theta T$. Accordingly, the brakes can be applied on a vehicle at the caliper pressure increasing rate corresponding to the conditions of both the road surface and the brake operation, thereby making it possible to improve the control feeling or the like.

According to a vehicle velocity estimating method and a vehicle velocity estimating apparatus of the present invention, as has been described above, a high-accuracy estimated vehicle velocity corresponding to an actual vehicle velocity can be obtained, thereby making it possible to control brakes and driving forces, for example, with high accuracy using the estimated vehicle velocity thus obtained. Further, the control itself is easy and hence the entire structure is also simple. As a result, a high-speed computation can be effected by using a simple program. Accordingly, the number of computations can be increased, thereby making it possible to achieve a further improvement in accuracy.

In a brake control method according to the present invention, after a wheel slip ratio and a wheel acceleration/deceleration have been determined, a target braking force for each brake can be directly estimated based on a membership function in which the wheel slip ratio and the wheel acceleration/deceleration are defined as inputs. Therefore, complex control is unnecessary and the optimum brake control can be effected by a simple process.

The amounts of increase and decrease in caliper pressure are set in a table stored as information in a storing means of a brake control system according to the present invention so as to be associated with the value of a given wheel acceleration/deceleration velocity and the value of a slip ratio. However, the value of the wheel acceleration/deceleration and the value of the slip ratio are set so as to be brought into high resolution in the vicinity of convergent target values for the wheel acceleration/deceleration and the slip ratio. Therefore, the convergency of the caliper pressure with respect to the convergent target values is improved. Further, the storage capacity can be reduced because the values of the wheel acceleration/deceleration and the slip ratio are set so as to be brought into low resolution as the brake pressure is separated from the convergent target values.

Further, in the brake control method and the brake control system according to the present invention, the opening and closing of a cut valve is repeatedly carried out at given time intervals under an up-and-down movement of an expander piston. Therefore, a caliper pressure increases upon the opening of the cut valve and decreases upon the closing of the cut valve. Accordingly, the caliper pressure can be increased along an arbitrary target pressure increasing rate by adjusting time intervals required to open and close the cut valve, thereby making it possible to prevent an abrupt increase in the caliper pressure and to improve the controllability. Further, a modulator, which is simple in structure, is available and inexpensive.

Furthermore, the state of a road surface and the state of input of a brake operation are detected. Then, the optimum pressure increasing rate of a caliper cylinder is set based on the detected states. The expander piston can be displaced in accordance with the optimum pressure increasing rate so as to increase caliper pressure, thereby making it possible to reliably achieve a further improvement in the control feeling or the like.

Having now fully described the invention, it will be apparent to those skilled in the art that many changes and modifications can be made without departing from the spirit or scope of the invention as set forth herein.

What is claimed is:

1. A method of controlling brakes, wherein the running stability of a vehicle and the degree of braking are controlled by adjusting caliper pressure, said method comprising the steps of:

determining a slip ratio of a wheel;

determining an acceleration of the wheel; and estimating caliper pressure from a table having a plurality of pre-stored brake caliper adjustment values therein, in which said determined slip ratio and said determined acceleration are used as inputs to the table, each of said pre-stored adjustment values corresponding in said table to respective values of said slip ratio and said acceleration, whereby at least one of values said adjustment is determined as a function of said determined acceleration and said slip ratio.

2. The method according to claim 1, wherein said table is changed depending on characteristics of a tire fixed onto the wheel.

3. The method according to claim 1, wherein said table is changed depending on vehicle running stability.

4. The method according to claim 1, further comprising the step of constructing said table using membership functions including a slip ratio membership function and a wheel acceleration membership function.

5. The method according to claim 4, wherein the slip ratio membership function is changed according to a tire characteristic.

6. The method according to claim 4, wherein the slip ratio membership function is changed according to vehicle running stability.

7. A method of controlling brakes, wherein the running stability of a vehicle and the degree of braking applied to the vehicle are controlled by adjusting brake caliper pressure, said system comprising:

wheel acceleration detecting means for detecting an acceleration of a wheel;

slip ratio computing means for computing a slip ratio with respect to the surface of a road traveled by the wheel;

storing means for storing a table, said table including a plurality of pre-stored brake caliper pressure adjustment values, which have been set so as to correspond to the value of said detected acceleration and the value of said computed slip ratio;

means for determining a brake caliper adjustment value from said table by applying value of said detected acceleration and said slip ratio to said table; and brake pressure controlling means for adjusting brake caliper pressure according to the determined brake caliper adjustment value from said table, whereby said adjustment value is determined as a function of said detected acceleration and said slip ratio.

8. The system according to claim 7, wherein said table is set based on membership functions corresponding to the wheel acceleration and the slip ratio.

9. The system according to claim 7 or 8, wherein said table is constructed using relatively high resolution data for the wheel accelerations and the slip ratios in the vicinity of respective target values to which said wheel acceleration and said slip ratio converge and relatively low resolution data when the wheel accelerations and the slip ratios are not in the vicinity of respective convergent target values.

10. A system according to claim 9, wherein said table is constructed using relatively low resolution data for the slip ratios and the wheel accelerations for the portion of the table in which the absolute value of said slip ratios and said wheel accelerations increase from 0 slip ratio and 0 wheel acceleration, respectively.

11. A method of controlling brakes using fuzzy logic comprising the steps of:

determining a slip ratio of a wheel, determining a wheel acceleration, accessing a fuzzy logic table to output a brake caliper pressure value in response to the input of said slip ratio and said wheel acceleration, and controlling a brake caliper according to the brake caliper pressure value output from said fuzzy logic table.

12. The method according to claim 11, further comprising the step of constructing said fuzzy logic table using membership functions including a slip ratio membership function and a wheel acceleration membership function.

13. The method according to claim 12, further comprising the step of changing the slip ratio membership function according to a tire characteristic.

14. The method according to claim 12, further comprising the step of changing the slip ratio membership function according to vehicle running stability.

15. The method according to claim 11, further comprising the step of constructing said fuzzy logic table to include relatively low resolution data for a portion of the fuzzy logic table corresponding to large absolute values of said slip ratio and said wheel acceleration.

16. The method according to claim 11, further comprising the step of constructing said fuzzy logic table to include relatively high resolution data for a range of fuzzy logic table entries corresponding to a slip ratio target value.

17. The method according to claim 16, wherein said range of fuzzy logic table entries corresponds to slip ratios within about 10% of a slip ratio target value.

18. The method according to claim 11, further comprising the step of constructing said fuzzy logic table to include relatively high resolution data for a range of fuzzy logic table entries corresponding to a predetermined wheel acceleration value.

19. The method according to claim 18, wherein said range of fuzzy logic table entries corresponds to wheel accelerations from about −1.0G to about +1.0G.

20. The method according to claim 11, further comprising the step of constructing said fuzzy logic table substantially as shown in FIG. 10.

21. The method according to claim 11, wherein said brake caliper pressure value is a value reflecting an amount of brake caliper pressure change.

22. The method according to claim 11, wherein said brake caliper pressure value is a brake caliper pressure.

23. A vehicle brake controlling apparatus controlling a vehicle brake by controlling brake caliper pressure comprising:

means for determining a slip ratio of a wheel, means for determining a wheel acceleration, a fuzzy logic table which outputs a brake caliper pressure value in response to the input of said slip ratio and said wheel acceleration, and a controller controlling a brake caliper according to the brake caliper pressure value output from said fuzzy logic table.

24. The apparatus according to claim 23, further comprising means for generating said fuzzy logic table using membership functions including a slip ratio membership function and a wheel acceleration membership function.

25. The apparatus according to claim 24, further comprising a means for changing said slip ratio membership function according to a tire characteristic.

26. The apparatus according to claim 24, further comprising a means for changing said slip ratio membership function according to vehicle running stability.

27. The apparatus according to claim 23, wherein said fuzzy logic table includes relatively low resolution data for a portion of the fuzzy logic table corresponding to large absolute values of said slip ratio and said wheel acceleration.

28. The apparatus according to claim 23, wherein said fuzzy logic table includes relatively high resolution data for a range of fuzzy logic table entries corresponding to a slip ratio target value.

29. The apparatus according to claim 28, wherein said range of fuzzy logic table entries corresponds to slip ratios within about 10% of a slip ratio target value.

30. The apparatus according to claim 23, wherein said fuzzy logic table includes relatively high resolution data for a range of fuzzy logic table entries corresponding to a predetermined wheel acceleration value.

31. The apparatus according to claim 30, wherein said range of fuzzy logic table entries corresponds to wheel accelerations from about −1.0G to about +1.0G.

32. The apparatus according to claim 23, wherein said fuzzy logic table is substantially as shown in FIG. 10.

33. The apparatus according to claim 23, wherein said brake caliper pressure value is a value reflecting an amount of brake caliper pressure change.

34. The apparatus according to claim 23, wherein said brake caliper pressure value is a brake caliper pressure.

* * * * *